United States Patent
Vitti et al.

(10) Patent No.: US 12,179,085 B2
(45) Date of Patent: Dec. 31, 2024

(54) GOLF PLAY OUTCOME SIMULATION MODELING SYSTEM

(71) Applicant: PGA TOUR Enterprises, LLC, Ponte Vedra Beach, FL (US)

(72) Inventors: Michael Vitti, Ponte Vedra Beach, FL (US); Jacqueline Shelly, Ponte Vedra Beach, FL (US); Joshua Oskwarek, Ponte Vedra Beach, FL (US)

(73) Assignee: PGA TOUR Enterprises, LLC, Ponte Vedra Beach, FL (US)

( * ) Notice: Subject to any disclaimer, the term of this patent is extended or adjusted under 35 U.S.C. 154(b) by 0 days.

(21) Appl. No.: 18/414,237

(22) Filed: Jan. 16, 2024

(65) Prior Publication Data

US 2024/0399232 A1 Dec. 5, 2024

Related U.S. Application Data

(63) Continuation of application No. 18/204,551, filed on Jun. 1, 2023, now Pat. No. 11,872,464.

(51) Int. Cl.
 *A63B 71/06* (2006.01)
 *G06F 7/58* (2006.01)

(52) U.S. Cl.
 CPC ......... *A63B 71/0616* (2013.01); *G06F 7/588* (2013.01)

(58) Field of Classification Search
 None
 See application file for complete search history.

(56) References Cited

U.S. PATENT DOCUMENTS

| 5,740,077 | A | 4/1998 | Reeves | |
|---|---|---|---|---|
| 6,321,128 | B1* | 11/2001 | Costin, IV | A63B 69/36 473/131 |
| 8,216,043 | B1 | 7/2012 | Perrone et al. | |
| 9,460,242 | B2 | 10/2016 | Kamino | |
| 9,514,604 | B1 | 12/2016 | Cioe | |
| 10,478,706 | B2 | 11/2019 | O'Connor et al. | |
| 11,607,601 | B1 | 3/2023 | Lovell et al. | |
| 11,745,084 | B1 | 8/2023 | Lovell et al. | |
| 11,872,464 | B1 | 1/2024 | Vitti et al. | |
| 2007/0167247 | A1 | 7/2007 | Lindsay | |

(Continued)

OTHER PUBLICATIONS

International Search Report issued Mar. 30, 2023 in connection with PCT Application No. PCT/US2023/010229.

(Continued)

*Primary Examiner* — Ronald Laneau
(74) *Attorney, Agent, or Firm* — Akerman LLP

(57) ABSTRACT

An golf tournament simulation method may include generating predicted hole scores for each hole of each round of a golf tournament. Historical shot data corresponding to a historical occurrence of one or more hole events may be utilized as weight to generate predicted outcomes of hole events for each hole. A score probability distribution may be assigned to the predicted outcomes to generate predicted hole scores. Simulations may be analyzed for predicted outcome probabilities such as win probability, cutline, or Top-10 finish probability. The simulations may be updated during actual play by replacing predicted scores with actual scores. Predicted outcome probabilities may be updated based on the updated simulations updated to include the actual scores.

30 Claims, 9 Drawing Sheets

(56) References Cited

U.S. PATENT DOCUMENTS

| | | |
|---|---|---|
| 2009/0017944 A1 | 1/2009 | Savarese et al. |
| 2009/0036237 A1 | 2/2009 | Nipper et al. |
| 2012/0238380 A9 | 9/2012 | Marty et al. |
| 2013/0166048 A1 | 6/2013 | Werner et al. |
| 2014/0067500 A1 | 3/2014 | Heineman et al. |
| 2016/0220885 A1 | 8/2016 | Huston et al. |
| 2018/0061173 A1 | 3/2018 | Khosla |
| 2018/0120428 A1 | 5/2018 | Tuxen et al. |
| 2018/0190077 A1 | 7/2018 | Hall et al. |
| 2019/0228290 A1 | 7/2019 | Ruiz et al. |
| 2020/0086200 A1 | 3/2020 | McCartin |
| 2020/0164258 A1 | 5/2020 | Tuxen |
| 2020/0230501 A1 | 7/2020 | Schwartz et al. |
| 2020/0349799 A1 | 11/2020 | Amaitis et al. |
| 2021/0118267 A1 | 4/2021 | Gupta et al. |
| 2021/0220718 A1 | 7/2021 | Tuxen et al. |
| 2021/0295533 A1 | 9/2021 | DeLeon et al. |
| 2022/0101683 A1 | 3/2022 | Elliott et al. |
| 2022/0138969 A1 | 5/2022 | Forsgren et al. |
| 2022/0176224 A1* | 6/2022 | Tuxen ............... G09B 19/0038 |
| 2022/0196783 A1 | 6/2022 | Dorris et al. |
| 2022/0219065 A1 | 7/2022 | Rankin et al. |
| 2022/0284628 A1 | 9/2022 | Tuxen et al. |
| 2022/0305365 A1* | 9/2022 | Cunningham-Rhoads ............... A63B 71/0669 |
| 2022/0347547 A1* | 11/2022 | Lucey ............... H04N 21/4781 |
| 2022/0387873 A1 | 12/2022 | Hall et al. |
| 2023/0199295 A1 | 6/2023 | Jansson et al. |
| 2024/0033600 A1 | 2/2024 | Cunningham-Rhoads et al. |
| 2024/0066355 A1 | 2/2024 | Seidl et al. |

OTHER PUBLICATIONS

Written Opinion of the International Searching Authority issued Mar. 30, 2023 in connection with PCT Application No. PCT/US2023/010229.

International Search Report issued Apr. 18, 2024 in connection with PCT Application No. PCT/US2023/081333.

Written Opinion of the International Searching Authority issued Apr. 18, 2024 in connection with PCT Application No. PCT/US2023/081333.

International Search Report issued Apr. 18, 2024 in connection with PCT Application No. PCT/US2023/081878.

Written Opinion of the International Searching Authority issued Apr. 18, 2024 in connection with PCT Application No. PCT/US2023/081878.

Stone, "Reference Points, Prospect Theory and Momentum on the PGA Tour," Calhoun: The NPS Institutional Archive, Dec. 2015.

* cited by examiner

200

```
Execute simulation method of FIG. 1 to generate predicted round scores for    ⎤ 200
each pre-cut round of the simulated tournament for each competing player       ⎦
                                    ↓
              Sum predicted round scores for pre-cut rounds  ⎤ 204
                                                              ⎦
                                    ↓
                       Establish cutline  ⎤ 206
                                           ⎦
                                    ↓
         Execute post-cut round simulations for players making cut  ⎤ 208
                                                                     ⎦
```

```
Execute the simulation method of FIG. 1 to generate round scores for each     ⎤ 302
round of the simulated tournament for each competing player                    ⎦
                                    ↓
              Sum predicted round scores for pre-cut rounds  ⎤ 304
                                                              ⎦
                                    ↓
                       Establish cutline  ⎤ 306
                                           ⎦
                                    ↓
    Include predicted or adjusted predicted round scores for post-cut          ⎤ 308
    rounds in predicted tournament score for players making cut                 ⎦
                                    ↓
    Retain predicted round scores for post-cut rounds of players missing       ⎤ 308
    the cut for use in prediction update protocols, if necessary                ⎦
```

FIG. 3

GOLF PLAY OUTCOME SIMULATION MODELING SYSTEM

CROSS-REFERENCES TO RELATED PATENT APPLICATION

This application is a continuation of U.S. patent application Ser. No. 18/204,551, filed Jun. 1, 2023 (U.S. Pat. No. 11,872,464, issued Jan. 16, 2024), the entirety of which is incorporated herein by reference.

TECHNOLOGY

The present disclosure relates to management of golf events including tournament simulation, which may further include live simulation updating.

BACKGROUND

There are numerous golf tournaments in which golfers may participate. In professional settings, tournaments are often connected to one of many organized golf tours. For example, the PGA TOUR is the world's premier membership organization for touring professional golfers, co-sanctioning tournaments on the PGA TOUR, PGA TOUR Champions, Korn Ferry Tour, PGA TOUR Latinoamérica and PGA TOUR Canada. Each tour typically comprises a schedule of a number of tournament events spread over a season during which players compete in each tournament as well as over the full season. For instance, some tours employ point systems to rank players over a season where points are awarded based on finish position at each tournament. A player's accumulated points may be used to determine eligibility for playoff or championship tournaments during a season. In some instances, accumulated points may be used to determine eligibility to participate in the same or other tours and events in future seasons.

Point systems should be representative of a player's level of play over the course of a season while also providing an element of excitement by providing a format where many players may be in contention for top rankings throughout a season. Striking a balance between these broad goals is important from the perspective of both players and fans.

What is needed are systems and methods for evaluating the potential effects of different schedules and point systems.

SUMMARY

In one aspect, a golf tournament simulation method includes retrieving relevant collective historical and historical player data from a statistics database to generate a hole event probability for each of one or more hole events for each hole of the round; processing the collective historical and historical player data through a hole event probability algorithm to generate the hole event probability for each hole event; calculating a predicted hole event outcome for each hole event using the generated hole event probability as weight in a weighted random generator algorithm; assigning a score probability distribution for each hole corresponding to the respective one or more predicted hole event outcomes for the hole; and inputting the assigned score probability distributions into a random score selector algorithm to generate the predicted hole score for each hole. The method may further include calculating a predicted round score from the predicted hole scores; repeating the generating of predicted round scores for all tournament rounds for each competing player and further repeating to generate a plurality of tournament simulations; calculating one or more outcome probabilities from the plurality of tournament simulations. In one example, the tournament simulations may be stored for update processing. Updates may be executed as necessary to all simulations during actual play of the tournament. Predicted outcome probabilities may be updating during actual play based on the updated simulations.

In one example, the predicted round score is a sum of the predicted holes scores of each hole in the round.

In one example, the predicted round score comprises an adjusted sum of the predicted hole scores of the round or a sum of adjusted predicted holes scores for the round.

In one example, the method includes applying a score adjustment based, at least in part, on historical player data of the player being simulated. The adjustment may be applied to each hole score or the predicted round score. The historical player data may comprise a differential in actual historical play of the player. In one configuration, the differential in actual historical play of the player may be a differential in average scoring in tournament rounds corresponding to the round being simulated relative to all tournament rounds. In some arrangements, adjustments to predicted holes scores may be based on a differential between average round score with respect to all tournament rounds of the player being simulated and average round score of the player in tournaments in the specific round being simulated. In one example of application of a score adjustment, a round adjustment may be applied to each predicted hole score output by the random score selector algorithm or round score calculated from the predicted holes scores if there is a historical play differential in round scoring average of the player being simulated for the simulate round relative to round scoring average of the player over all tournament rounds.

In one example, the historical play comprises a rolling average over one or more seasons. In one configuration, more recent historical data points in the historical play are weighed more heavily.

In one example, the method may include applying a cutline protocol to each tournament simulation according to tournament rules and excluding predicted round scores for post-cut rounds in predicted tournament scores for players predicted not to make cut. In one configuration, the cutline protocol includes executing round simulations for pre-cut rounds to generate a predicted round score for each pre-cut round for all players; establishing a tournament cutline based on the predicted round scores from the pre-cut rounds; and executing round simulations for post-cut rounds for players predicted to make the cut to generate predicted round scores for post-cut rounds for players predicted to make the cut. In another configuration, the cutline protocol comprises executing round simulations for pre-cut and post-cut rounds to generate a predicted round score for pre-cut and post-cut rounds for all players and establishing a golf tournament cutline based on the predicted round scores from the pre-cut rounds.

In one example, hole event probabilities correspond to a probability of the hole event occurring on the hole.

In one example, the relevant collective historical and historical player data are representative of historical occurrence of the hole event in actual play in same or similar level tournament play.

In one example, the relevant collective historical data is representative of historical occurrence of the hole event in actual tournament play by players collectively with respect to multiple holes and the specific hole being simulated, and the historical player data is representative of historical occurrence of the hold event by the player being simulated with respect to multiple holes.

In one example, the relevant collective historical and historical player data correspond to the occurrence of the hole event on holes having a hole attribute corresponding to that of the hole being simulated. For instance, the attribute may be a par value.

In one example, the hole event outcome of a first hole event for a first hole specifies an element required for identification of the relevant collective historical and historical player data to be used to generate a hole event probability of a second hole event for the first hole.

In one example, the method also includes calculating more hole event probabilities for par 4 holes, par 5 holes, or both than for par 3 holes.

In one example, the one or more hole events comprise a first hole event, wherein the first hole event comprises shot location off-tee and the first hole event probability comprises a probability the player hits the shot location off-tee. In one example, the off-tee shot location outcomes are based on an attribute of the hole. For instance, the attribute of the hole may be par rating for the hole, and the first hole event probability for par 4 holes may include a probability the player hits the fairway off-tee. The first hole event probability for a par 3 hole may include a probability the player hits the green off-tee. In some configurations, at least one hole comprises a second hole event comprising a shot location of a subsequent shot. The subsequent shot location outcomes may correspond to an attribute of the hole. In one instance, the attribute is a par rating for the hole. For example, the second hole event probability for par 4 holes may include a probability the player hits the green from a location determined by the predicted outcome of the first hole event.

In one example, each hole includes a first hole event corresponding to a location of a shot. The first hole event may correspond to an off-tee location hole event comprising green for par 3 holes and fairway for par 4 and par 5 holes. The relevant collective historical and historical player data for the off-tee location hole event may include, for par 3 holes: player GIR % on par 3 holes, collective GIR % for the hole, and collective GIR % on par 3 holes, and, for par 4 and par 5 holes: player hit fairway on par 4 and par 5 holes, collective hit fairway % for the hole, and collective hit fairway % on par 4 and par 5 holes. In a further configuration, a second hole event for at least some of the holes. The second hole event may correspond to a shot location of a shot subsequent to the off-tee shot. In one example, generating a predicted hole score for par 4 holes includes retrieving relevant collective historical and historical player data from the statistics database using the predicted hole event location outcome for the off-tee location hole event calculated for the hole as a statistical from location to calculate a probability of the subsequent shot location hole even. Using the corresponding location hole event probability as weight in the weighted random generator algorithm, the predicted hole event location outcome for the subsequent shot location hole event may be calculated. According to one method, calculating the predicted hole outcome for the subsequent shot location hole events for par 5 holes may be performed in a manner similar to par 4 holes. In one example, if the predicted hole event location outcome for the off-tee location hole event calculated for the hole is fairway, the relevant collective historical and historical player data for the subsequent shot location hole event comprises historical statistics corresponding to historical occurrence of hitting the green from the fairway comprising player GIR % from fairway on par 4 and par 5 holes, collective GIR % on from fairway on the hole, and collective GIR % from fairway on par 4 and par 5 holes. If the predicted hole event location outcome for the off-tee location hole event calculated for the hole is non-fairway, the relevant collective historical and historical player data for the subsequent shot location hole event comprises historical statistics corresponding to historical occurrence of hitting the green from non-fairway comprising player GIR % from non-fairway on par 4 and par 5 holes, collective GIR % from non-fairway on the hole, and collective GIR % from non-fairway on par 4 and par 5 holes.

In any of the above or another example, the hole event probability algorithm comprises $$P(\text{Event}) = \frac{\frac{xy}{z}}{\frac{xy}{z} + \frac{(1-x)(1-y)}{(1-z)}}$$

where x is a historical occurrence of the player performing the hole event, y is a collective historical occurrence of the hole event on the particular hole, and z is a collective historical occurrence of the hole event during play on multiple courses.

In one instance, a first hole event probability for par 4 and par 5 holes comprises a probability the player hits the fairway off-tee, and x is player hit fairway % on par 4 and par 5 holes, y is collective hit fairway % for the hole, and z is collective hit fairway % on par 4 and par 5 holes. A second hole event probability for the par 4 holes and par 5 holes may include a probability the player hits green on its subsequent shot from a location specified by the predicted outcome of the first hole event. In one application, if the predicted outcome of the first hole event is hit fairway, the collective historical and player collective historical data correspond to historical occurrence of hitting the green from the fairway and x is player GIR % from fairway on par 4 and par 5 holes, y is hole collective GIR % from fairway on hole, and z is collective GIR % from fairway on par 4 and par 5 holes. If the predicted outcome of the first hole event is missed fairway, the historical statistics correspond to historical occurrence of hitting the green from the non-fairway and x is player GIR % from non-fairway on par 4 and par 5 holes, y is hole collective GIR % from non-fairway, and z is collective GIR % from non-fairway on par 4 and par 5 holes. In any of the above or another example, the first hole event probability for par 3 holes may be a probability the player hits the green off-tee and x is player GIR % on par 3 holes, y is collective GIR % for the hole, and z is collective GIR % on par 3 holes.

In one example, the one or more predicted hole event outcomes for each hole are binary.

In one example, each hole is associated with a plurality of score probability distributions, each score probability distribution corresponding to a specific predicted hole event outcome or combination of predicted hole event outcomes of the hole. The score probability distributions may be representative of historical score distributions on the hole given the occurrence of each of the potential hole event outcomes or combination thereof. Assigning the score probability distribution may include pairing the one or more predicted hole event outcomes for the hole with the score probability distribution that corresponds to the predicted hole event outcomes.

In one example, calculating one or more outcome probabilities includes calculating a probability of a predicted outcome including analyzing simulations for an occurrence of the predicted outcome, and dividing the number of simulations predicting the occurrence of the predicted outcome by the number of total simulations. In one example, the one or more predicted outcomes include a score or range of scores on one or more holes of a round of the tournament, a score or range of scores on one or more holes in two or more rounds of the tournament, a hole event on one or more holes of a round of the tournament, a hole event on one or more holes in two or more rounds of the tournament, or combination thereof. In the above or another example, the one or more predicted outcomes include a specific score or score in a specified range for one or more rounds or the tournament, a specified hole score on one or more holes of one or more rounds, or combination thereof. In any of the above or another example, the one or more predicted outcomes include a ranking of the players by round finish position, a finish position of a player, a range of finish position of a player, or combination thereof. In any of the above or another example, the one or more predicted outcomes include a probability a player finishes with the lowest round score, a probability a player finishes with a round score within a specified ranking of finish positions, or combination thereof. In any of the above or another example, the one or more predicted outcomes include a ranking of the players by finish position in one or more rounds of the tournament, a ranking of players by finish position in the tournament, a finish position of a player in one or more rounds of the tournament, a finish position range in one or more rounds of the tournament, a tournament win, making a cut, a cutline, or combination thereof. In any of the above or another example, the one or more predicted outcomes comprise a probability ranking of the players by finish position in one or more rounds of the tournament, a probability ranking of players by finish position in the tournament, a finish position probability of a player in one or more rounds of the tournament, a probability a player finishes within a finish position range in one or more rounds of the tournament, a probability a player wins the tournament, a probability a player makes a cut, a cutline probability, or combination thereof. In one example, the predicted outcome probability comprises a win probability, a top-10 finish probability, a cutline probability, and a probability of making a cut.

In one example, updating the simulations may include substituting actual hole scores for predicted hole scores as players complete holes; updating predicted round scores, accounting for the substituted actual holes scores; summing predicted round scores, as updated, for all tournament rounds to generate updated predicted tournament scores for competing players; summing predicted round scores, as updated, for pre-cut rounds to establish an updated cutline; including predicted round scores for post-cut rounds to scores of players updated to make cut; and excluding predicted round scores for post-cut rounds to scores of plays updated to not make cut.

In one example, updating the simulations may be performed at less than 30 second intervals during play when actual live scoring data has been received. In one example, the updates may be performed at less than 20 second, 15 second, 10 second, or 5 second intervals. It may also be updated based on a scoring or shot event that occurs within play of the actual tournament.

In one example, updating the simulations is performed during play of the actual golf event until the conclusion of the event.

In one example, the method further comprises moving the information for each player into a database using a player ID and a time-stamp to show most recent probabilities allowing for trending displays for television broadcast and digitally across digital platforms.

In a further aspect, a machine-readable medium carrying machine readable instructions, which when executed by a processor of a machine, causes the machine to carry out the above method, including any combination of the associated examples.

In a further aspect, a system including a processor, and a storage medium storing instructions, which when executed by the processor, causes the system to carry out the above method, including any combination of the associated examples.

In yet a further aspect, a golf tournament simulation modeling system may include a statistical database including historical statistics of golf play. A hole event probability generator may be configured to use the historical statistics to generate one or more hole event probabilities with respect to each hole of each round of a golf tournament based at least a portion of the historical statistics. A hole event outcome generator may be configured to generate hole event outcomes using the hole event probabilities as weight. The hole event generator may include or be configured to access operations of a weighted outcome generator configured to generate outcomes for the hole events using the hole event probabilities as weights. A hole score generator may be configured to assign a score probability distribution for each hole based on the one or more hole event outcomes generated for the hole. The hole score generator may include or be configured to access operations of a score distribution engine configured to generate or provide the hole score probability distributions for the potential combinations of hole event outcomes. The hole score generator may include or be configured to access operations of a random score generator configured to generate a random score based on the hole score probability distribution identified by the hole score generator. A prediction engine may be configured to output predictions with respect to the golf tournament. The prediction engine may include a predictive outcome generator configured to generate prediction outcomes. Additionally or alternatively, the prediction engine may include a predictive outcome probability generator configured to generate a probability of one or more predicted outcomes based on prediction of the predicted outcomes in a plurality of simulations of the golf tournament. An update processor may be configured to update one or more predicted outcomes, predicted outcome probabilities, or both based on inclusion of actual score data following the start of actual play.

BRIEF DESCRIPTION OF THE DRAWINGS

The novel features of the described embodiments are set forth with particularity in the appended claims. The described embodiments, however, both as to organization and manner of operation, may be best understood by reference to the following description, taken in conjunction with the accompanying drawings in which:

FIG. 2 illustrates a further aspect to the simulation method of FIG. 1 for application of a cutline according to various embodiments described herein;

FIG. 3 illustrates a further aspect to the simulation method of FIG. 1 for application of a cutline in addition to or alternatively to the aspect illustrated in FIG. 3 according to various embodiments described herein;

DESCRIPTION

Figure 1:
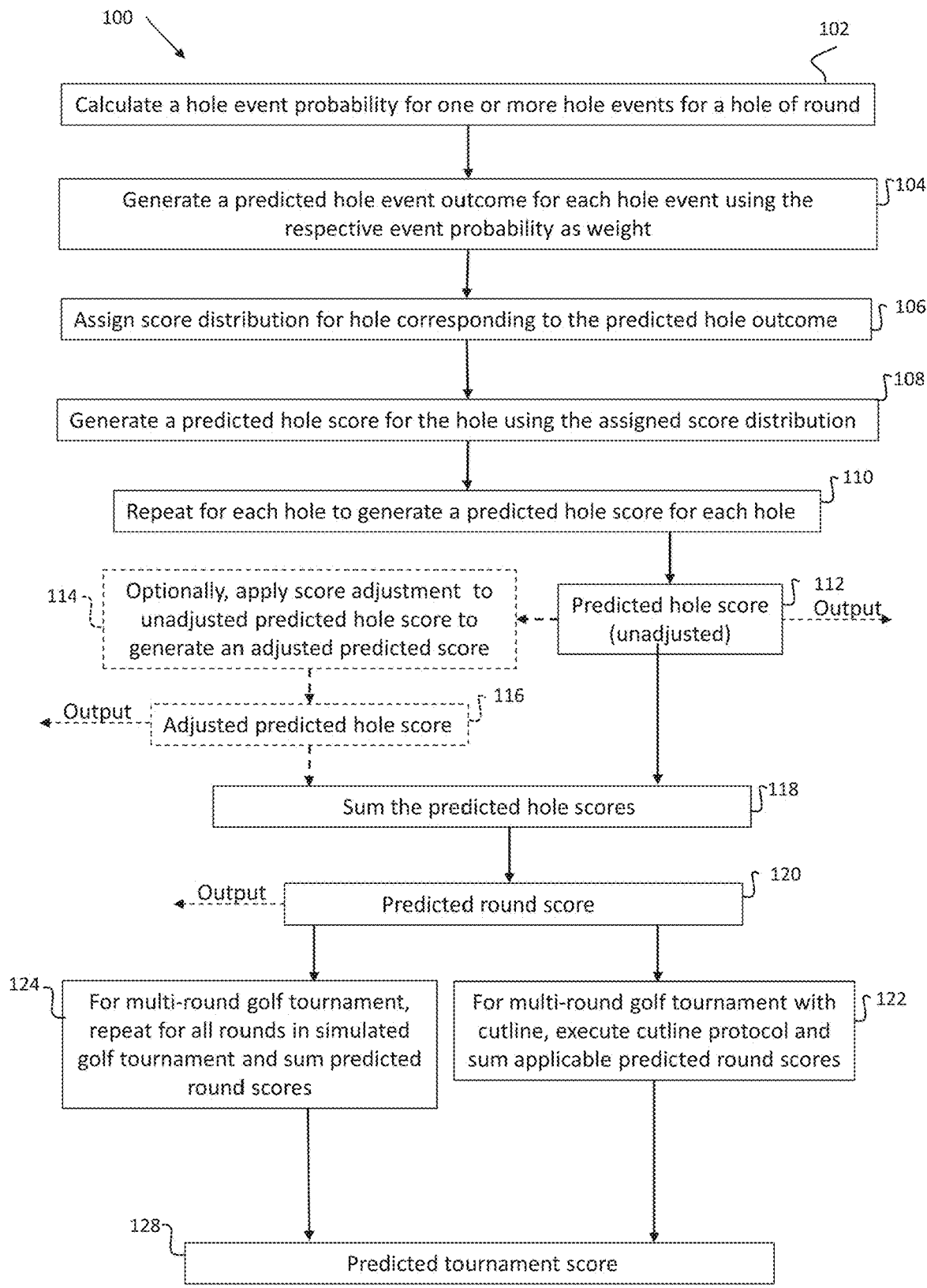
FIG. 1 illustrates a simulation method to generate a predicted round or tournament score according to various embodiments described herein.

Point systems play an important role in a golf tour season. Accumulated points may be used to rank players for eligibility for current and future season events, tournaments, categories, and tours. There are countless potential variations that may be employed in a point system. For instance, players typically accumulate points over a tour schedule based on tournament finishes, with the largest point allocations being award to first place finishes and progressively smaller point allocations being awarded to subsequent finishes. However, different point distributions may be applied to different tournaments with respect to predicted finish position, total allotment of points available, or both. All players may not be eligible for every tournament and even those that are eligible may choose not to participate in a particular tournament or may miss the cut and, thus, receive no points. In order to provide the best product to both players and fans, identification of a fair point system that also breeds excitement over a season is essential to tour organizers.

During a tour season, both prior to tournaments and during tournament play, projection of tournament performance of a player, the field, or both can be a valuable tool to tournament organizers and players with respect to event scheduling, broadcast pieces, and play decisions, to name a few. Performance projections may also add to the excitement for fans by providing a running projection that illustrates how actual performance of players dynamically changes projected performance outcomes during tournament play as some players exceed predicted performance and other players fall below predicted performance.

The present disclosure describes various systems and methods of simulating golf play. FIGS. 1-11 illustrate various aspects of simulation modeling systems and methods described herein. With general reference to FIG. 10, a simulation modeling system 10 may be configured to simulate various aspects and levels of such aspects of golf play and generates predictive model outputs derived from the simulations. For example, the system 10 may be configured to simulate play of golf holes, play of portions of golf holes, golf rounds, golf tournaments, or combination thereof. Simulations may correspond to single rounds, multiple rounds of a tournament, full tournaments, multiple tournaments of a season, full seasons, or as otherwise desired. In one embodiment, the system 10 may be configured to simulate golf play and generate predictions for such simulations to evaluate the effects of different tournament schedules, eligibility, and points systems across multiple tournament events or tour season to assess player risk, optimize season cadence and number of designated events, and create a new competitive system.

The simulation modeling system 10 may include a hole event probability generator 20 configured to generate one or more hole event probabilities for simulated holes. The system 10 may include or access a statistical database 12 comprising historical player data 14, collective historical data 16 or both that the hole event probability generator 20 may use to generate hole event probabilities. The system 10 may include or access a hole event outcome generator 30 configured to generate hole event outcomes using the hole event probabilities as weight. In the illustrated embodiment, the hole event outcome generator 30 includes or accesses a weighted outcome generator 32 configured to generate outcomes for the hole events using the hole event probabilities as weights. The system 10 may include or access a hole score generator 40 configured to generate hole scores using the event outcomes for each hole. The hole score generator 40 may include or access a score distribution engine 42 configured to generate or provide hole score probability distributions for combinations of hole event outcomes. The hole score generator 40 may include or access a random score generator 44 configured to generate a random score based on the hole score probability distribution identified by the hole score generator 40. The system 10 may include a prediction engine 60 configured to output predictions. The prediction engine 60 may include one or both of a predictive outcome generator 62 configured to generate prediction outcomes or a predictive outcome probability generator 64 configured to generate probabilities of prediction outcomes. In one example, the probabilities of prediction outcomes are based, at least in part, on prediction of the prediction outcomes in a plurality of simulations of the golf tournament. In some embodiments, the system 10 includes or accesses a modification engine 50. The modification engine may include one or more of a score adjustor 52 or a cutline executor 54. The score adjustor 52 may be configured to adjust scores, e.g., hole scores, of players. As described in more detail below, in some embodiments, the score adjuster is configured to adjust scores based on a player's relative historical round play with respect to the round being simulated. The cutline executor 54 may be configured to execute a cutline protocol and apply a cutline to post-cut scores when pre-cut round scores are insufficient to make a predicted or actual cut in a simulation. In one embodiment, the system 10 includes an update processor 70 configured to update predicted outcomes, predicted outcome probabilities, or both based on inclusion of actual score data following the start of actual play. Predicted outcomes may include predicted round or tournaments score, finish position, make cut, cutline, or the like. Predicted outcome probabilities may include probabilities of the predicted outcomes based on analysis of multiple simulations.

In some implementations, the evaluations, predictions, and probabilities, which may collectively be referred to herein as predictions or predictive model outputs or simply predictive outputs, may be based on historical player data 14, collective historical data 16, e.g., course statistics, player statistics, and, where applicable, PGA TOUR ShotLink® data. Predictive model outputs may include one or more of hole event outcomes, hole scores, hole ranks, round scores, tournament scores, round finish position probabilities, tournament finish position probabilities, or the like, for single players or multiple players. In some embodiments, the system 10 may be configured to generate predictive outputs selected from one or more of a predicted round score, tournament score, round rank, or tournament finish position of a player. In one configuration, predictive model outputs correspond to a player finishing at a specified finishing position or finishing position range. For example, the predictive outcome probability generator 64 may be configured to generate predictive model outputs including one or more of win probability or top-10 finish probability for players in a golf tournament based on historical player data 14, collective historical data 16, e.g., course statistics, player statistics, and, where applicable, PGA TOUR ShotLink® data. Additionally or alternatively, the cutline executer 54 may be configured to execute a cutline, and the predictive outcome generator 62 may be configured to generate a predictive output that predicts a cutline value/target score to make the cut, players that will make the cut, or both. The predictive outputs may be made available before start of a corresponding tournament, during competition or both. For instance, the simulation modeling system 10 may be configured to estimate win probabilities for each player before a golf event is played. Thus, predictions may be generated for use prior to the start of a round, tournament, or season. In some configurations, the system 10 may additionally or alternatively be configured, e.g., via an update processor 70, to generate in-round or updated predictions continuously, periodically, or upon request during live tournament play by employing a hybrid simulation model that substitutes actual hole event results or scores for play that has occurred and simulation model results for the hole events or scores that have not yet occurred.

The generated simulation may emulate each player in the field playing each hole of the tournament for each of the tournament rounds, typically four rounds, using historical play statistics, which may be stored in the statistical database 12, which may include historical player data specific to the actual players for which the simulations are generated, collective historical data 16 of a population of similarly situated players, e.g., competing at the same or similar level, as the players for which the simulations are generated, or combination thereof. For example, historical statistics may be taken from the PGA TOUR's ShotLink® statistical data archive that are specific to the players as well as collective statistics of competitors from previous tournaments. The historical statistics applied to a simulated hole, e.g., with respect to a hole event of the hole, may be specific to the hole, correspond to holes having similar attributes (par value, dogleg, elevation, etc.), or may be generally applied without consideration of the hole or hole attributes.

In various embodiments, the system 10 may run a single simulation of a hole, round, multiple rounds, or tournament with respect to a single player, multiple players, or all players. In one example, the predictive outcome generator 62 generates predicted outcomes with respect to one or more holes, a round, multiple rounds, or the tournament, such as a predicted score on one or more holes, a score on a particular round or through multiple rounds, or the tournament. Additional examples of predicted outcomes include, but are not limited to, a predicted cutline value, a cutline prediction with respect to a player, a predicted finishing position or range of finishing positions for one or more players, or a combination thereof.

In some embodiments, the system 10 may be configured to run simulations multiple times, e.g., hundreds or thousands of times. In one example, the predictive outcome probability generator 64 is configured to generate probabilities of predicted outcomes with respect to one or more holes (e.g., probability of a birdie on a particular hole or set of holes, probability of scoring under par over a particular number of holes, or the like), a round (e.g., probability of scoring over par, probability of scoring 3 under in second round, or the like), multiple rounds (e.g., probability of scoring in the top 5 over the first two rounds), or the tournament (e.g., probability of finishing in the top 5, probability of scoring 10 under or less). Additional examples of predicted outcomes probabilities include, but are not limited to, a probability of a cutline value or range of values, a probability of a player making the cut, a finishing position probability or probability of a player finishing within a range of finishing positions, or a combination thereof. According to one methodology, the system 10 may be configured to establish a win probability prediction (which may also be referred to herein as a type of predicted outcome probability comprising a predicted finish position probability) for a player or multiple players, such as each player in a tournament field based on a number of times that a player finishes first in an individual simulation of the event divided by the total number of simulations run. In one embodiment, the system 10 may be further configured to update win probabilities or other predicted outcome probabilities, via the update processor 70, during actual events as real scores are posted by running simulations on remaining holes and combining the simulated scores with the actual scores on holes played.

As introduced above and described in more detail below, the system 10 may be configured to generate simulations that output cutline predictions, via the prediction engine 60. Additionally or alternatively, the system 10 may implement cutlines in simulations, via the cutline executor 54. For instance, in a tournament simulation, a cutline may be employed based on pre-cut round simulations that removes a player from post-cut round simulations of a first tournament simulation if the pre-cut round simulations result in the player not making the cut according to tournament rules, such as top (x) number of players after (y) number of holes, players within (2) strokes of a leader after (y) number of holes, or both. In one example, the cut line may be implemented by the cutline executor 54 after the first 36 holes (e.g., two rounds). However, as many tournament simulations may be run for a particular tournament, a second tournament simulation may result in the player making the cut and, thus, the play of the player will be simulated in such tournament simulations wherein the player is simulated to make the cut. In some embodiments, all rounds may be simulated for all players. If the player does not make the cut in the simulation based on pre-cut results, the cutline executor 54 executes the cutline and the update processor 70 excludes the post-cut simulation results. However, if actual play changes the actual or predicted cutline such that the player makes or is predicted to make the cut, the update processor 70 may be configured to introduce the post-cut simulation results of the player as well as the impact to predictions of other players. Thus, the system 10 may dynamically update predicted outcomes of the field based on actual play. In various embodiments described herein, if a player is predicted to not make the applicable tournament cut, the predicted tournament score may include only predicted round scores for pre-cut rounds. It will be appreciated that such predicted tournament score may be tagged or otherwise marked or organized as corresponding only to pre-cut rounds. For example, a predicted tournament score of a player that is not predicted to make the cut may be marked as did not make cut or categorized or listed with predicted scores of players predicted to not make the cut.

FIG. 1 illustrates a simulation method 100 that the system 10 may be configured to execute according to various embodiments to generate one or more of a predicted hole score comprising an predicted hole score (unadjusted) 112 (via operations of the hole event probability generator 20, hole event outcome generator 30, and hole score generator), a predicted hole score comprising an adjusted predicted hole score 116 (via operation of the score adjustor 52), or predicted (adjusted or unadjusted) predicted round score 120 (via operation of the predictive outcome generator 62). In various embodiments, the method 100 may further include execution of simulations of multiple rounds in a simulated golf tournament to generate a predicted (adjusted or unadjusted) tournament score 128. In some embodiments, multiple predicted round scores may be used to implement a cutline with respect to a player or to identify the cutline with respect to the field (see, e.g., FIGS. 2 & 3). As described in more detail below, for example with respect to FIG. 4, in a further embodiment, the method 100 or generated outputs thereof, may be further utilized within a method to generate a predicted round or tournament finish position (via operation of the predictive outcome generator 62). As also described in more detail below, for example with respect to FIG. 5, in a further embodiment, the methods or generated outputs thereof, may be further utilized within a method to generate a performance finish probability (via operation of the predictive outcome probability generator 64).

Figure 10:
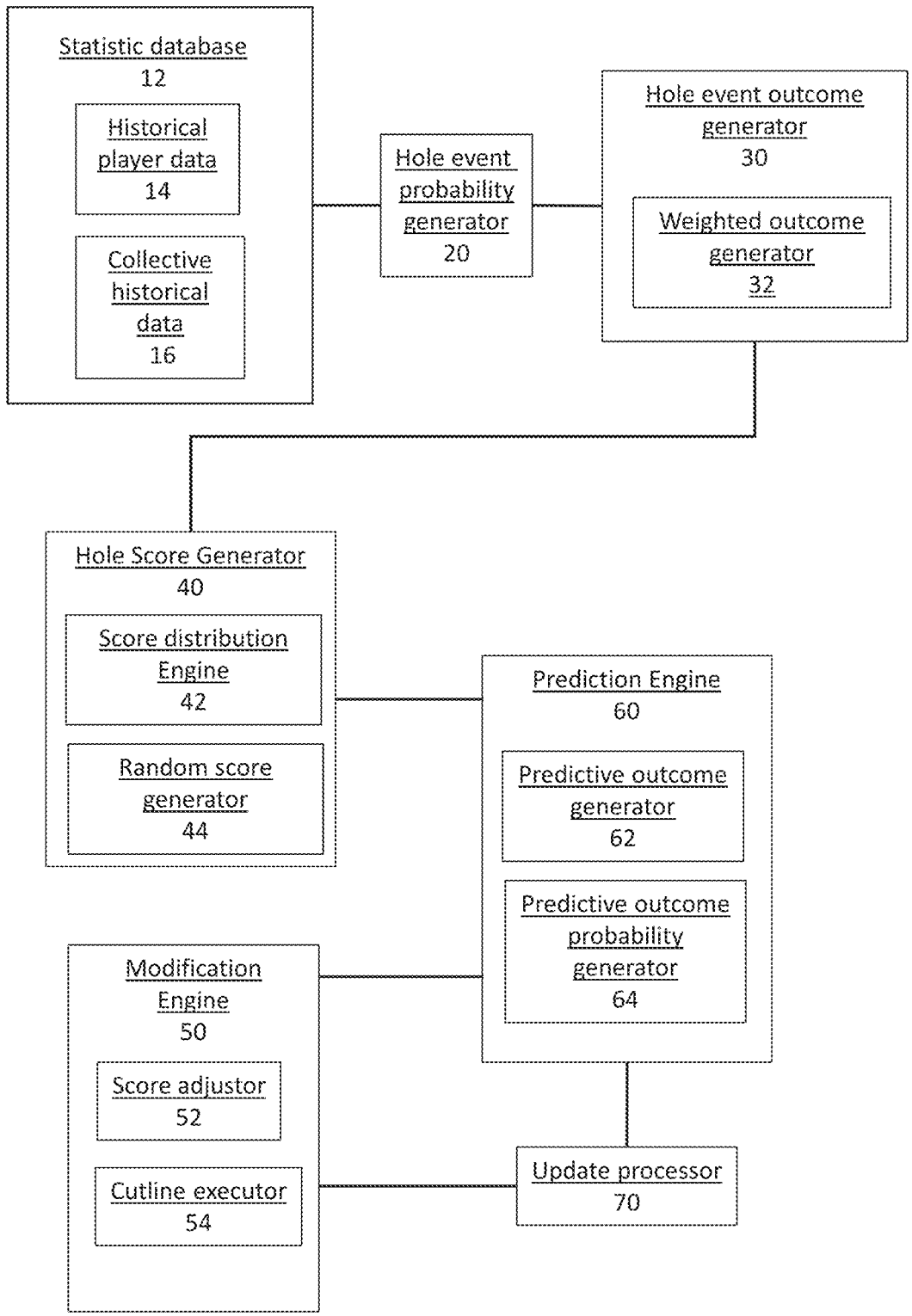
FIG. 10 illustrates a simulation modeling system according to various embodiments described herein.

With continued reference to FIG. 1 together with FIG. 10, the hole event probability generator 20 may be configured to calculate event probabilities 102 for one or more hole events of a hole. Hole events may include events with respect to a hole that may be performed by the player during play on the hole. Example hole events may include but are not limited to, an off-tee hole event, one or more sequent shot hole events, or combination thereof.

The system 10 may provide a flexible platform upon which simulations may be generated utilizing actual historical performance data of player. For example, the system may be configured to generate hole event probabilities based on actual historical data, which may be referred to herein as historical occurrence data and may include player historical data 14, collective historical data 16, or both. Historical player data 14 includes statistics specific to a player being simulated. In one example, historical player data 14 includes statistics corresponding to historical occurrence of a hole event. Collective historical data 16 includes collective statistics of multiple players, e.g., one or more season averages for all similarly situated competitors, such as those competing in a same or similar level of play. For instance, collective historical data 16 for use in a PGA TOUR simulations may be those taken from PGA TOUR statistics of overall competitor play, such as PGA TOUR averages. In one example, collective historical data 16 includes statistics corresponding to collective historical occurrence of a hole event generally with respect to multiple holes or specific holes in which a hole event is being simulated. For instance, for a hit green hole event on the fourth hole of play in a PGA TOUR tournament played on the Copperhead Course, collective historical occurrence statistics may be PGA TOUR green-in-regulation ("GIR") % for all par 3 holes during tournament play over one or more PGA TOUR seasons or portions thereof, PGA TOUR GIR % averages for the fourth hole on the Copperhead Course during tournament play over one or more PGA TOUR seasons or portions thereof. As another example, some tournaments may be played by players from multiple tours, such as the US OPEN. Collective historical data, e.g., occurrence, statistics may be taken from play on one, all, or any combination of the tours. In a further example, the statistics used may be taken from play on the tour or tours the specific player being simulated competes.

Historical player data 14 may include a statistical percent or relative occurrence the player performs the hole event during play. In one configuration, such historical play statistics may be specific to a hole attribute corresponding to the hole in which the hole event is being simulated. For instance, statistics for holes having similar hole attributes, such as par value, may be used to generate one or more hole event probabilities with respect to the hole being simulated. In one example, statistics corresponding to a historical occurrence of a hole event on par 3 holes may be used for calculating the probability of the occurrence of a corresponding hole event in simulations with respect to par 3 holes. In a further example, historical player data 14 comprising statistics corresponding to historical occurrence of a hole event on par 4 holes may be used for one or more hole events with respect to par 4 holes while those corresponding to a hole event on par 5 holes may be used for one or more hole events with respect to par 5 holes. In one configuration, historical player data 14 comprising statistics corresponding to historical occurrence of a hole event on par 3 holes may be used for one or more hole simulations with respect to par 3 holes and statistics corresponding to historical occurrence of a hole event on par 4 and par 5 holes may be used for simulations with respect to one or more hole events simulated with respect to par 4 and par 5 holes. As described in more detail below, in some embodiments, multiple hole event outcomes may be generated for all or some holes of a round. In some such configurations, statistics corresponding to historical occurrence of some hole events for one or more simulated holes may correspond to attributes, such as par value, of the simulated hole while statistics used for one or more other hole events for the one or more simulated holes may correspond to different hole attributes or may be hole attribute neutral. Thus, a hole may have multiple hole events wherein the statistics used to calculate the probability of a first hole event may be those collected from play on actual holes having similar first hole attribute to the hole being simulated while the statistics used to calculate probability of second hole event of the hole may be those collected from play on actual holes having similar second hole attributes, different than the first, to the hole being simulated or may be collected from play on all holes, regardless of attributes. While historical player data 14 comprising statistics corresponding to the occurrence of a hole event being simulated with respect to a player are generally described herein as corresponding to the player on multiple holes rather than play on the specific hole being simulated, in some embodiments, historical player data 14 comprising statistics of the player with respect to play on the hole being simulated may additionally or alternatively be utilized to generate a hole event probability for the hole. In one embodiment, historical player data 14 comprising statistics may be taken over all an available period of time, rounds, or seasons. Additionally or alternatively, statistics may be taken over a predetermined period of time, number of rounds, or seasons or partial seasons, which may include a current season or only prior seasons.

Collective historical data 16 may be taken from play on the particular hole being simulated, holes in general, or holes having attributes similar to those being simulated. Collective historical data 16 may comprise collective statistics corresponding to historical performance of a hole event by multiple players, such as a precent or relative occurrence of the hole event from players competing at a similar level as the player being simulated, which may include professional tournament competition in the case of simulation of professional play. Professional tournament completion may also be divided by level, such as tiers, tours, leagues, or the like. In some embodiments, the collective statistics with respect to the occurrence of a hole event may be selected to be those that are representative of the level of competition being simulated.

In one configuration, collective historical data 16 used to calculate probability of a hole event may be taken from historical statistics of actual play on holes having similar hole attributes to the hole being simulated. For example, a historical occurrence of the hole event on par 3 holes may be used for simulations of par 3 holes, par 4 holes for simulations of par 4 holes, or par 5 holes for simulations of par 5 holes. In one configuration, historical occurrence of the hole event on par 3 holes may be used for simulations of par 3 holes and the combined historical occurrence of the hole event on par 4 and par 5 holes may be used for simulations of par 4 and par 5 holes. As described in more detail below, in some embodiments, multiple hole event outcomes may be generated for all or some holes of a round. In some such configurations, historical occurrence of some hole events for one or more holes may correspond to attributes, such as a par value, of a hole while one or more hole events for the one or more holes may correspond to different hole attributes or may represent general collective historical occurrence of the event with respect to the play of the players on all holes.

Additionally or alternatively to utilization of collective historical data 16 comprising statistics corresponding to occurrence of hole events with respect to play on multiple courses to determine a hole event probability, the hole event probability generator 20 may utilize statistics corresponding to collective historical occurrence of the hole event with respect to collective play on the actual hole being simulated. For example, a hole event probability may be generated, at least in part, based on actual collective historical occurrence of the hole event on the hole. In various embodiments, hole events probabilities may be based on historical player statistics with respect to occurrence of the hole event and collective historical statistics, both generally and specific to a simulated hole, with respect to the occurrence of the hole event.

In some embodiments, collective historical data 16 with respect to multiple courses, collective historical data 16 with respect to the hole, historical player data 14 with respect to the player being simulated, or combination thereof may be taken over an available period of time, rounds, or seasons. Additionally or alternatively, the statistics may be taken over a predetermined period of time, number of rounds, or seasons or partial seasons, which may include a current season or only prior seasons. In various embodiments, collective historical data and player historical data may be taken relative to different time periods, seasons, or otherwise. For example, collective historical data, such as collective statistics for courses, may be based on three to five year averages, which may depend on availability and relevance due to changes such as course alterations. Historical player data, such as statistics for players, may be based on a lesser period of time, such as one to three year rolling average. In a further example, the rolling average is weighted for more frequent play for relevance to the current tournament. In some examples, the hole event probability generator 20 is configured to employ a recently weighting that weighs more recent data points more heavily than less recent data points. The weighting may be progressive. For example, available statistics over a period of time, such as a number of seasons, such as five seasons, may be used wherein the data points corresponding to the most recent season(s) with respect to the occurrence of the hole event are weighted as to impact the statistics more heavily than the less recent season(s). In some embodiments, multiple or blocks of seasons may have the same weights applied while others have different or no weighting applied. In another example, data points from each season of the number of seasons are progressively weighted to apply the most weight to the data points from the most recent season. While seasons are used to describe an example weighting scheme above and elsewhere herein, it is to be appreciated that many weighting schemes may be applied in addition to or alternatively. For example, as level of play may vary based on competitors competing in a particular tournament, tournaments may be divided into groupings that more closely correspond to the expected level of play. For instance, the hole event probability generator 20 may weigh data points collected from major tournaments more heavily when simulating a major tournament (e.g., Masters, US Open, Open Championship, PGA Championship) or may weigh data points collected from one or more tiers of non-major tournaments more heavily when simulating similar level non-major tournaments. As noted above, statistics with respect to historical occurrence of a hole event may be selected to those corresponding to the level of play being simulated. For instance, statistics corresponding to a tour may be used with respect to simulations of play with respect to that tour. However, in some embodiments, statistics corresponding to multiple tours may be used, e.g., when the level of play corresponds.

As introduced above, various hole events may be used. For instance, hole events may include off-tee hole events, subsequent shot hole events, e.g., second or third, or both. In various embodiments, off-tee hole events, subsequent shot hole events, or both may include shot location attributes. For example, off-tee or subsequent shot locations may include outcomes such as fairway, non-fairway, green, rough, hazard/sand, native area, out of bounds, or other area of the hole. The historical occurrence data used to generate probabilities of the particular hole event outcomes may include historical occurrence of the hole event corresponding to the off-tee or on a subsequent shot hole event with respect to the player or collective players.

In some embodiments wherein a hole includes multiple hole events, a generated outcome of one hole event in step 104 specifies the historical occurrence data the system is to utilize for calculation of the probability of a second hole event. For example, a first hole event on a par 4 may be hit fairway (example outcomes of hit fairway, missed fairway), and a second hole event may be hit green (example outcomes of hit green, missed green). The hole event probability generator 20 may utilize historical occurrence data with respect to hitting fairway off-tee to calculate probability of hitting the fairway to generate a hit fairway or missed fairway outcome with respect to the first hole event. If the outcome of the first hole event is hit fairway, the hole event probability generator 20 may use historical occurrence data to calculate probability of a GIR from the fairway with respect to the second hole event. If the outcome of the first hole event is missed fairway, hole event probability generator 20 may use historical occurrence data with respect to GIR % from other than fairway to calculate probability of a GIR from a non-fairway location.

According to various embodiments, hole events may include putt count or score when another hole event occurs such as GIR, GIR approach shot from fairway, rough, sand bunker, natural area, or otherwise. In one example, a hole event following a generated missed green outcome of a prior hole event includes scramble or so scramble and utilizes historical scramble occurrence data. In a further or another example, a prior hole event outcome includes a location and the historical scramble occurrence data is based on scramble from the outcome location. In some embodiments, a generated location outcome may include sand bunker and a subsequent hole event may include sand save or no sand save, and the historical occurrence data used to generate the outcome utilizes historical sand save occurrence data. Additionally or alternatively, off-tee or subsequent shot location hole events may include distance outcomes such as within a predefined distance from hole on green, e.g., inside 5', inside 10', between 10'-15', from >20', e.g., with respect to a putt hole event, scramble hole event, or sand save hole event. In one example, an off-tee hole event may include a drive distance, such as a percentage of hole yardage covered by tee shot. In a further example, the historical occurrence data utilized is specific to the par attribute of the hole, such as percentage of hole yardage covered by tee shot on par 4 or percentage of hole yardage covered on par 5. As another example, a first hole event may include a sand location and a second hole event may correspond to GIR from sand or a sand save. As noted above, the potential outcomes may include distance or distance components with respect to location such as from >30 yards, from 20-30 yards, from 10-20 yards, from <10 yards. In such instances, the historical occurrence data utilized may correspond to the relevant statistics with respect to the generated outcome. In one embodiment, hole event probability generator 20 is configured to apply historical occurrence statistics of the player with respect to the hole event, collective historical occurrence statistics with respect to the hole, and historical occurrence statistics with respect to general hole, which may include holes having similar attributes, to the hole events described herein.

Calculation of the one or more hole event probabilities for a hole 102 (e.g., via the hole event probability generator 20) may utilize various probability models. In one configuration, the hole event probability generator 20 may calculate a hole event probability according to one example of step 102 employing a modified adaptation of the log 5 formula from Bill James Baseball Abstract of 1983, credited to Dallas Adams, which may be referred to as the log 5(M) event probability model.

$$P(\text{Event}) = \frac{\frac{xy}{z}}{\frac{xy}{z} + \frac{(1-x)(1-y)}{(1-z)}}$$

As modified, the formula is repurposed to estimate the probability of a particular event happening at a specific time for each hole on each course played. The algorithm is used to create a weighted probability for each hole event.

According to one implementation, historical player data and collective historical data for multiple players are used where x=historical occurrence of the player performing the hole event, y=collective historical occurrence of the hole event on the particular hole, and z=collective historical performance of the hole event during play on multiple courses, which may include holes having similar attributes to the hole being played, as described above and elsewhere herein. As also noted above and elsewhere herein, the collective historical data, player historical data, or both may take data points over an available time period, predetermined time period, or both. Some embodiments may incorporate a substitution approach when data is not available, missing, or incomplete. For instance, if insufficient data for a player is available, a generalized probability may be applied, such as one taken from a player that scores most like the player based on the available statistics. Some embodiments may weigh more recent statistics more heavily.

As introduced above, the hole event outcome generator 30 may utilize the output probability as a weight to generate a predicted hole outcome for each hole event 104. The outcome generation function may be performed by various methods. In one example, the hole event outcome generator 30 executes the outcome generation function utilizing a weighted random outcome generator 32 that uses the generated hole event probabilities as weights. In some embodiments, method 100 may also include assigning the one or more hole events to each hole for which the respective hole event probability will be calculated and the respective corresponding hole event outcome will be generated.

Some or all holes may include multiple hole events for which probabilities are calculated and corresponding outcomes are generated. Thus, some simulated holes on a course may be associated with fewer or more hole events than one or more other holes on the course. In various embodiments, the potential outcomes of hole events may be binary, ternary, quaternary, quinary, or as otherwise aligned with a number of events simulated for a hole. For example, with respect to binary potential outcomes of a hole event, the hole event probability applies to two potential outcomes, such as hit fairway and missed fairway. The potential outcomes may be abbreviated, e.g., either "1" for a positive outcome (hit fairway, hit green) or a "0" for a negative outcome (missed fairway, missed green). Thus, using a binary example, a hole outcome including one hole event may be represented as (1) or (0). A hole outcome including two hole events may be represented at (1, 1), (0, 1), (1, 0), or (0, 0). As introduced above, in some embodiments a second hole event on a hole requires determination of the outcome of a first hole event, e.g., to specify the historical occurrence data or hole event outcomes applicable to the second hole event.

The hole score generator 40 may be configured to use a generated hole outcome, e.g., (1, 0, 2), (0), (1, 1), etc., to assign a score probability distribution for the hole that corresponds to the predicted hole outcome 106. In various embodiments, the hole event outcome generator 30 identifies a score probability distribution from a plurality of predefined score probability distributions, each assigned to a predicted hole outcome with respect to the one or more hole events. A score probability distribution for each hole outcome combination may be obtained or generated, e.g., by the score distribution engine 42, for each hole. Score probability distributions may typically be generated prior to play and be applied the same for each player. In one example, score probability distributions may represent historical distribution of scores on a hole corresponding to the combination of hole event outcomes generated for the hole. In one embodiment, score probability distributions correspond to historic score distributions when the combination of hole event outcomes are present. For instance, the score probability distributions may be specific to the hole using historical collective scoring for the hole with respect to the combination of hole events, specific to collective historical data with respect to the combination of hole events on holes in general or on similar par holes, e.g., par 3 holes, par 4/5 holes, specific to the player's historical scoring with respect to the combination of hole events on holes in general or on similar par holes, e.g., par 3 holes, par 4/5 holes, or combination thereof. As described above with respect to historical occurrence data, in some embodiments, the score distribution engine 42 may select the historical distribution to encompass a predetermined period of time or number of seasons. In a further or another example, recency weighting may be applied by the score distribution engine 42 to weigh more recent data points more heavily than older data points. However, in other examples, the score probability distributions may be based on score distributions on holes having similar attributes, e.g., par type, be player or group of players specific, or combination thereof.

Utilizing the score probability distribution assigned to the hole based on the combination of simulated hole outcomes, the hole score generator 40 may be configured to generate a predicted hole score for the hole 108. Various methods may be used to generate the predicted hole score using the assigned score probability distribution. For instance, the hole score generator 40 may be configured to choose a randomized score based on the assigned historic probability distribution related to scores of the same historic outcomes recorded on that particular hole based on the generated predicted hole event outcome or combination of predicted hole event outcomes. In one example, the hole score generator 40 is configured to generate a predicted hole score for the hole 108 using a random score generator 44 that incorporates the assigned score probability distribution. The random score generator 44 may apply the particular score probabilities in the assigned distribution when randomly generating the score for the hole. As an example, an assigned hole distribution may specify:

Triple Bogey=.02
Double Bogey=.03
Bogey=.15
Par=.60
Birdie=.20
Eagle=.02

The random score generator 44 may, for example, randomly select a score from the above distribution wherein the availability of each score choice for random selection is defined by the relative distribution.

The hole score generator 40 may output the predicted hole score (unadjusted) 112. Additionally or alternatively, the system 10 may repeat generation of a predicted hole score for each hole to generate a predicted hole score (unadjusted) 112 for each hole 110. The prediction engine 60 may also be configured to sum the predicted hole scores for the round 118 to calculate a predicted round score 120. In some embodiments, the method may come with output of the predicted hole round score 120 for the player. However, in a further embodiment, the system 10 may be configured to further execute simulations for additional rounds of the tournament 122, 124 and generate a predicted tournament score 128. For instance, for a multi-round golf tournament, the system 10 may be configured repeat generation of predicted hole scores for all rounds in a simulated golf tournament that the prediction engine 60 may sum 122, 124, and output a predicted tournament score 128 for the player.

In a further or another embodiment, the modification engine 50 may be configured to apply the score adjustor 52 to the predicted scores to generate adjusted scores. One or more score adjustments, such as score differential adjustments, may be applied to predicted hole scores 114 to generate an adjusted predicted score 116. Various adjustments may be employed. For example, player specific adjustments may include adjusting the predicted score for a hole or round using historical scoring data for the player. In various embodiments, the score adjustor 52 may be configured to adjust scores of players based on a situational differential in average scoring of the player. The situation may include one or more of chronological (such as recent better or poorer performance), seasonal (fall, winter, spring, summer), geographical (type of course topography or style, course elevation, geographic location or region of course), environmental (such as particular weather conditions, e.g., heat, cold, humidity, or rain), tournament schedule (such as in a particular tournament, major tournaments, early season tournaments, late season tournaments, tournaments after not making the cut, or tournaments following a week off), or round schedule (such as a particular tournament round). For example, a differential may exist between a player's average scores or those of others with respect to particular courses, rounds, weather conditions, elevations, time of year, or combination thereof. As another example, a differential may exist between a player's average scores and the player's scores while playing in particular situations, such as any of those above. In some embodiments, different situational differential adjustments may be applied to different players based on the existence of a statistically significant differential in the player's average scoring in a situations relevant to the play being simulated. For instance, if the simulation is for a round played at a desert course early in the tournament season a differential adjustment may be applied to players in which a scoring differential exists in one or both these situations. In one example, the system may track situational differentials in player scores and account for one or more of those differentials when relevant to the simulation via a score differential adjustment. In some embodiments, the one or more situations used with respect to the score differential adjustment is the same for all competing players. In one configuration, the situation may relate to a particular tournament round being simulate and differential adjustments may include a round specific component that captures a differential in the player's performance for a particular round being simulated, e.g., second round, relative to the player's broader average score performance. For example, hole or round scores may be adjusted by an differential adjustment factor particular to the player based on the player's historic scoring average differential, e.g., the player's relative season average score, for the round that is currently being simulated. For example, the differential between the player's broader scoring average for the current season or other period of time, e.g., a rolling average over the period of time, or seasons and that for the particular round therein may be applied. The differential adjustment may be applied, for example, to the round score or may be divided by 18 and applied to each hole score in the round as an adjustment factor. In one example, a rolling average over a preceding number of weeks or months may be used. In any of the above examples, the scoring averages may be weighted such that more recent performances are given more weight than older scores. For example, a rolling average taken over the past 52 weeks, if available, may be used to generate the differential adjustment factor, and may be weighted for more recent performance. In some embodiments, if scores are not available for the player over the entire rolling period, scores for a shorter period that is available may be used. In one embodiment, a rolling average of a previous number of available tournament scores may be used, which may include weighting.

In one method, the differential adjustment is made by adding or subtracting, as the case may be, the player's relative scoring average differential for the round being simulated. For instance, a player having a round scoring average of 72 with respect to all rounds of tournament play (total tournament score divided by number of tournament rounds) may have a scoring average of 71 in third rounds of tournament play. Thus, for third round play simulations, the predicted round score may be subtracted by −1, the player's average scoring differential for the round, to generate an adjusted predicted round score. Similarly, to adjust predicted hole scores rather than predicted round scores, the system 10 may divide the average scoring differential for the round by the number of holes in the round, e.g., 18, to obtain the differential adjustment factor for the player's average hole scoring differential for the round, which, in this example, is about −0.06. Accordingly, −0.06 may be subtracted from each unadjusted predicted hole score to generate adjusted predicted hole scores. Such a hole-by-hole scoring adjustment may be used such that when the real scores for the holes are substituted for their respective simulated hole scores, the differential adjustment factor for the remaining holes to be played in the round remains.

In some embodiments, additional or alternative adjustments specific to the player may be utilized. For example, differential adjustments specific to the player may include those of the player relative to the field in the simulated round or tournament or the field in other rounds or tournaments. For example, after the predicted score for each hole of the round is established for an individual player, the score may be adjusted by the average relative scores of the player vs field in the current season or other predefined period of time or seasons. In a further example, a hole or round score may be adjusted based on a historical score vs field in corresponding rounds. In an above or another example, a player's hole or round score may be adjusted based on their relative season average round scoring adjustment versus the field and a historic scoring adjustment by course and round. In some embodiments, the score adjustor 52 may apply differential adjustments based on a player's scoring average specific to hole attributes. For example, predicted hole scores on par 3 holes may be adjusted by the player's relative scoring average differential on par 3 holes for the round being simulated while the predicted hole scores on par 4 and par 5 holes are adjusted by the player's relative scoring average differential on respective par 4 and par 5 holes for the round being simulated.

After adjustments are applied, which is optional is some embodiments, the score adjustor 52 may be configured to output adjusted predicted score 116. Additionally or alternatively, the system 10 may repeat generation of an adjusted predicted hole score for each hole. The predictive outcome generator 62 may also be configured to sum the adjusted predicted hole scores for the round 118 to calculate a predicted round score 120 (or adjusted predicted round score) comprising summed adjusted hole scores. In some embodiments, the method 100 may complete with output of the predicted round score 120 for the player comprising summed adjusted or unadjusted predicted round scores. However, in a further embodiment, the system 10 may be configured to further execute simulations with respect to all the rounds of the tournament 122, 124 to calculate a predicted tournament score 128 comprising summed adjusted or unadjusted predicted round scores, or both. For instance, for a multi-round golf tournament, the system 10 may be configured repeat generation of predicted hole scores for all rounds in the simulated golf tournament 122, 124, sum the rounds scores, and output an adjusted predicted tournament score 128. While the illustrated method 100 depicts application of the differential adjustments to unadjusted predicted hole scores, in some embodiments, differential adjustments may be applied to unadjusted predicted round scores, unadjusted predicted tournament scores, or both in addition to or alternatively to application to unadjusted predicted hole scores.

In some embodiments, the system 10 may include cutline executor 54 configured to apply a cutline by application of a cutline protocol 124. Cutlines are typically applied after one or more rounds of a tournament. If a player does not make the cut based on the pre-cut round scoring, the player does not play post-cut rounds or receive a score for the post-cut rounds. Various cutline protocols may be used. For instance, the system may be preprogramed with a cutline or may be configured to identify a predicted cutline, e.g., based on previous cutlines from prior tournaments on the course or similar courses. In one configuration, the cutline may be based on previous cutlines from courses having similar difficulty as determined from prior collective scoring. In any of the above, the cutline protocol may further consider the performance of the players on the same or similar courses. As described in more detail below with respect to FIGS. 2 & 3, the system 10 may be configured to generate a predicted cutline by simulating tournament play for each player or each player realistically in contention to make the cut.

It is to be appreciated that the simulation methods may be executed multiple times, e.g., thousands of times, and the output scores may be summed and divided by the number of simulation trials to obtain extended average predicted (adjusted or unadjusted) scores. In some embodiments, the system may be configured to execute the averaging on a per hole basis for each simulated hole, on a per simulated round basis, a per tournament basis for each simulated tournament, or any combination thereof.

FIG. 2 illustrates an example of a cutline protocol 200 according to various embodiments. According to this protocol, the system 10 is configured to execute the simulation method of FIG. 1 to generate predicted (adjusted or unadjusted) round scores for each pre-cut round of the simulated tournament for each player competing in the tournament 202. The system 10 may sum the predicted (adjusted or unadjusted) round scores for pre-cut rounds 204. The cutline executor 54 may establish the cutline 206 according to tournament rules and apply the cutline to identify the players predicted to make the cut. Having identified the players predicted to make the cut, the cutline executor 54 may execute post-cut round simulations for players making cut 208 according to FIG. 1 to obtain predicted (adjusted or unadjusted) scores for one or more players.

FIG. 3 illustrates an example of cutline protocol 300. Cutline protocol 300 is similar to cutline protocol 200 except that the cutline executor 54 executes simulations for both pre-cut and post-cut rounds to generate predicted (adjusted or unadjusted) round scores for each round of the simulated tournament for each competing player 302. The system 10 may sum the predicted (adjusted or unadjusted) predicted round scores for pre-cut rounds 304. The cutline executor 54 may establish the cutline 306 according to tournament rules and apply the cutline to identify the players predicted to make the cut in order to include predicted (adjusted or unadjusted) round scores for post-cut rounds in predicted (adjusted or unadjusted) tournament score for players making cut 308. According to this protocol 300, the system 10 retains the predicted (adjusted or unadjusted) round scores for post-cut rounds of players missing the cut for use in prediction update protocols, if necessary 310. As the cutline may dynamically move during actual play based on the updated predicted scores of the competing players, cutline protocol 300 may be used to reduce computation for updates based on actual data, e.g., during live tournament play. If implementing cutline protocol 200, the system 10 may run additional round simulations for players that are subsequently predicted to make the cut based on actual scoring.

Figure 4:
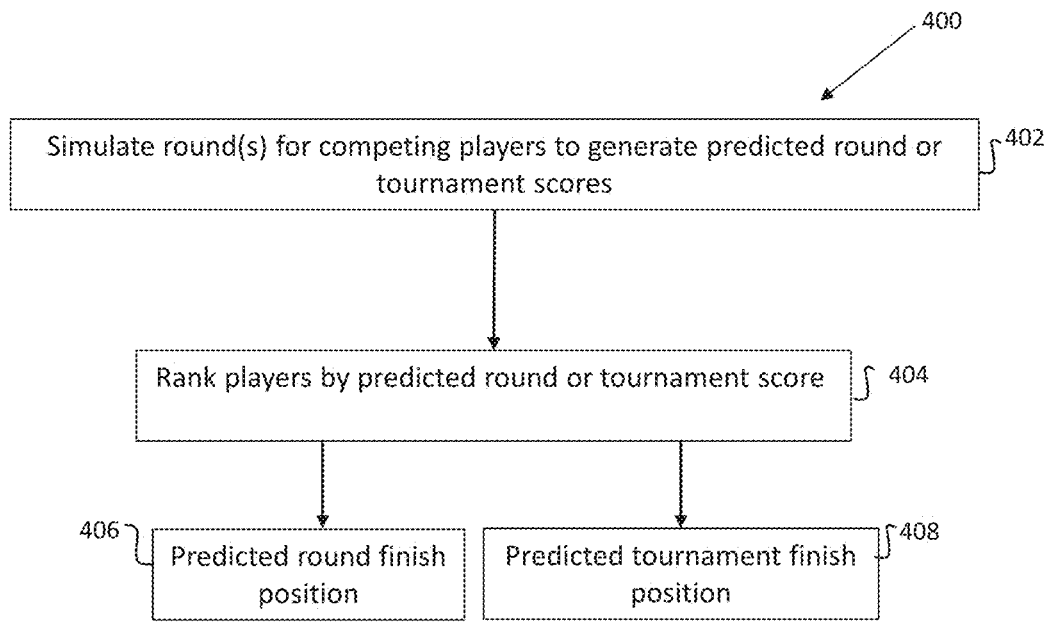
FIG. 4 illustrates a further aspect of the simulation method for generating predicted finish positions according to various embodiments described herein.

FIG. 4 illustrates an example method 400 to generate a predicted round finish, predicted tournament finish, or both according to one embodiment. The method 400 includes execution of the relevant portion of simulation method of FIG. 1 for competing players to generate predicted (adjusted or unadjusted) score. The predictive outcome generator 62 may rank players by predicted (adjusted or unadjusted) score 404 to output a predicted round finish, predicted tournament finish, or both for one or more players.

As described above an elsewhere herein, method 100 and other similar methods described herein, which in some examples may include method 200, method 300, or method 400, or predictive outcome generator 62 may be used to generate predicted outcomes with respect to a round or tournament simulation such as a predicted cutline, make or miss cut, a predicted score with respect to one or more holes, rounds, or tournament, or a predicted round or tournament finish position. In additional or alternative embodiments, the predictive outcome probability generator 64 may be configured to generate predicted outcome probabilities with respect to predicted outcomes, which may include cutlines or finish positions such as win probabilities, top-10 finishes, or the like.

Figure 5:
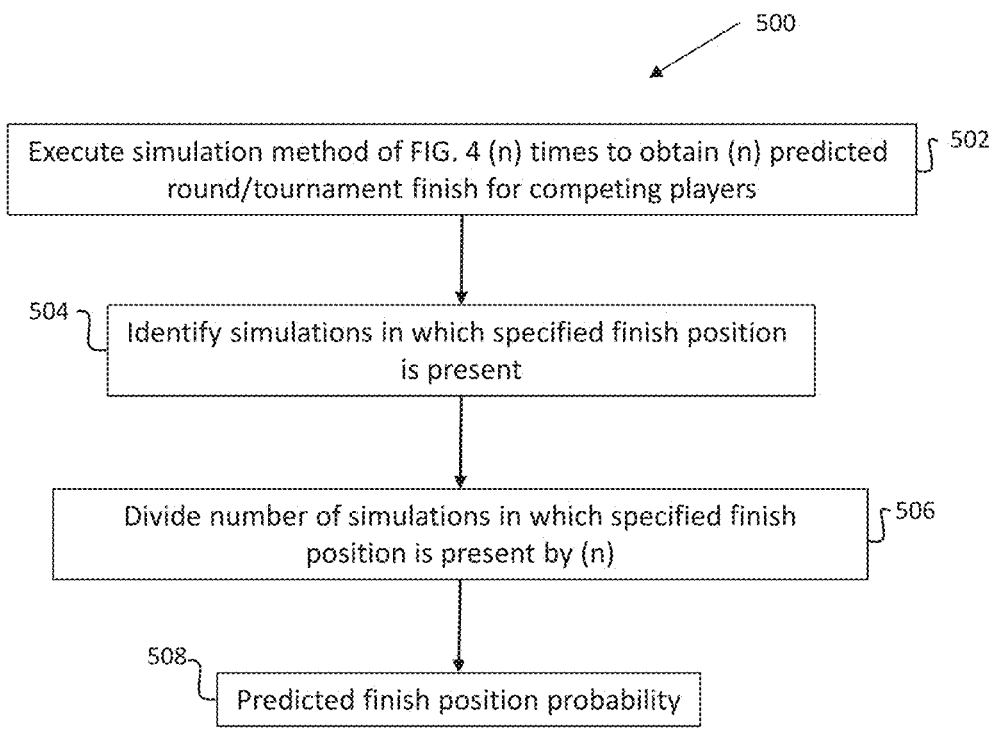
FIG. 5 illustrates a further aspect to the simulation method for generation of a predicted finish position probability according to various embodiments described herein.

FIG. 5 illustrates an example method 500 to generate a finish position probability by executing multiple simulation trials. The method 500 includes executing the simulation method of FIG. 4 (n) times to obtain (n) predicted round/tournament finishes for the players competing in the tournament 502. The predictive outcome probability generator 64 may identify simulations in which specified finish position is present 504. For example, the performance finishes may be win or top (x) positions, such as top 5, 10, 15, 20, etc. The predictive outcome probability generator 64 may divide the number of simulations in which the specified finish position is present by (n) 506 to output a performance probability finish with respect to a specified finish position. For example, if the specified finish position is wins and player 1 was predicted to win the tournament 370 times out of 3000 simulation trials, a win probability of about 12.3% may be output. As another example, if the specified finish position is top-10 finishes and player 1 was predicted to finish in the top-10 in 2200 of the 3000 simulation trials, a top-10 finish probability for player 1 of about 73.3% may be output.

Figure 6:
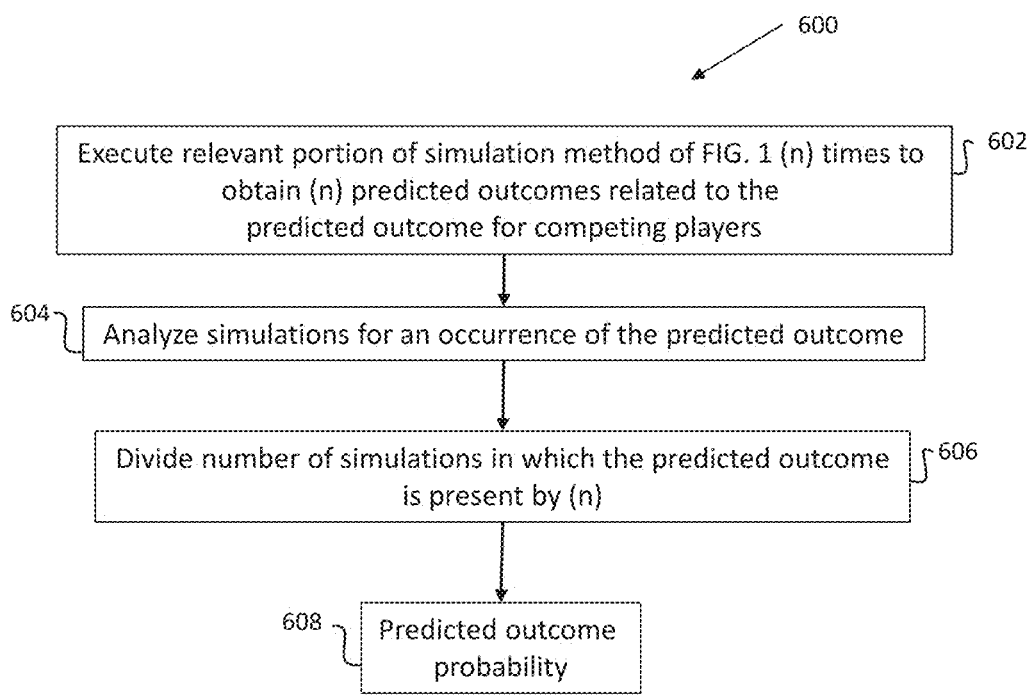
FIG. 6 illustrates a further aspect to the simulation method for generation of a predicted outcome probability according to various embodiments described herein.

FIG. 6 illustrates an example method 600 to generate an outcome probability by executing multiple simulation trials. The method 600 includes executing the simulation method of FIG. 1 (n) times to obtain (n) predicted outcomes for one or more competing players 602. For example, if the outcome is a player's score on a particular hole, round, or tournament, the system 10 may need only run multiple simulations for a player rather than all competing players. However, the system 10 may also run multiple simulations for multiple or all competing players, e.g., for generation of predicted finish position, cutline, or other predicted outcomes from the simulations. The predictive outcome probability generator 64 may identify simulations in which the predicted outcome is present 604. The predictive outcome probability generator 64 may divide the number of simulations in which the predicted outcome is present by the total number of simulations (n) at step 606 and output an outcome probability with respect to the predicted outcome. For example, if the predicted outcome is making the cut, the system may run 5000 simulations according to method 100 to generate predicted (adjusted or unadjusted) round scores, and which may further include performing method 200 or method 300, for pre-cut rounds of competing players. If player 1 makes the cut in 3,779 simulation trials, a probability of making the cut of about 75.56% may be output. As another example, if the predicted outcome is cutline of +3, the system 10 may run simulations as in the above example and the predictive outcome probability generator 64 may identify simulations in which the cutline was +3. If the cutline was +3 in 1500 simulations, a 30% probability of a cutline of +3 may be output. If the predicted outcome is a cutline of +3 or less and 3000 simulations had a cutline of +3 or less, a 60% probability of a cutline being+3 or less may be output. As yet another example, if the predicted outcome is scoring under par for a particular round, the system may run simulations for the particular round to generate predicted (adjusted or unadjusted) round scores for the player and identify rounds in which the player scored under par. If the player scored under par in 2500 out of 5000 simulations, the predictive outcome probability generator 64 may output an under par probability of 50%. Predicted outcomes may include finish positions, e.g., as described with respect to FIG. 5, wherein the scores of players in each simulation are ranked to identify finish position.

As introduced above, the systems and methods described herein may include updating predictions based on actual scores. The predictions may be updated in real time as scores are received or at intervals as real time scores are received to provide a hybrid simulation including a mix of actual and simulated data. In some embodiments, the real time updates may be continuous during live play at pre-defined intervals, upon receipt of actual scores, or both. In various embodiments, such a hybrid simulation model may be executed via a substitution scheme wherein actual scores are substituted for simulated scores, e.g., in all simulations in multiple simulation embodiments. For example, as each score comes in, the system may substitute an actual score for the corresponding predicted score. Thus, as the actual scores are made, the system may substitute the actual scores for the predicted scores and update relevant outcome predictions (e.g., hole score, round or tournament score, cutline values, make or miss cut, finish position).

When the method includes generating predicted outcome or finish position probabilities based on multiple simulation trials, the system may substitute the actual play scores for the corresponding predicted scores as described above in all simulations and update prediction probabilities, which may correspond to finish position predictions or scores for the competing players, cutlines, or other changes that may be attendant to the updates in each simulation. For example, in situations wherein the system applies a cutline, the cutline may dynamically move based on the updated predicted scores of the competing players. Thus, within a simulation trial, the players predicted to make the cut may dynamically change during play and the system may include post-cut scores for players predicted to not make the cut from predictions (e.g., score, rank, etc.) and exclude post-cut scores for players predicted to miss the cut throughout tournament play. As the changes in each simulation may change probabilities generated from multiple simulations, the system may also update the probabilities. For example, the system may update the scores in all simulations, including accounting for changes in a cutline for each simulation when used, and update relevant predicted finish position and outcome probabilities based on the updates over the simulations.

In one embodiment, the system is configured to generate win probability, top-10 finish probability, cutline value, making the cut probabilities, or combination thereof. Once competition starts, the system is configured to update predictions and probabilities based actual scoring data. For example, pre-competition win probability estimates may change to a combination of actual scoring data and simulated scoring data. The model may then be configured to produce outputs to estimate top-10 finish probability, cutline value, making the cut probability, or combination thereof, using the same approach employed during pre-tournament phase, but with a substitution method.

Figure 7:
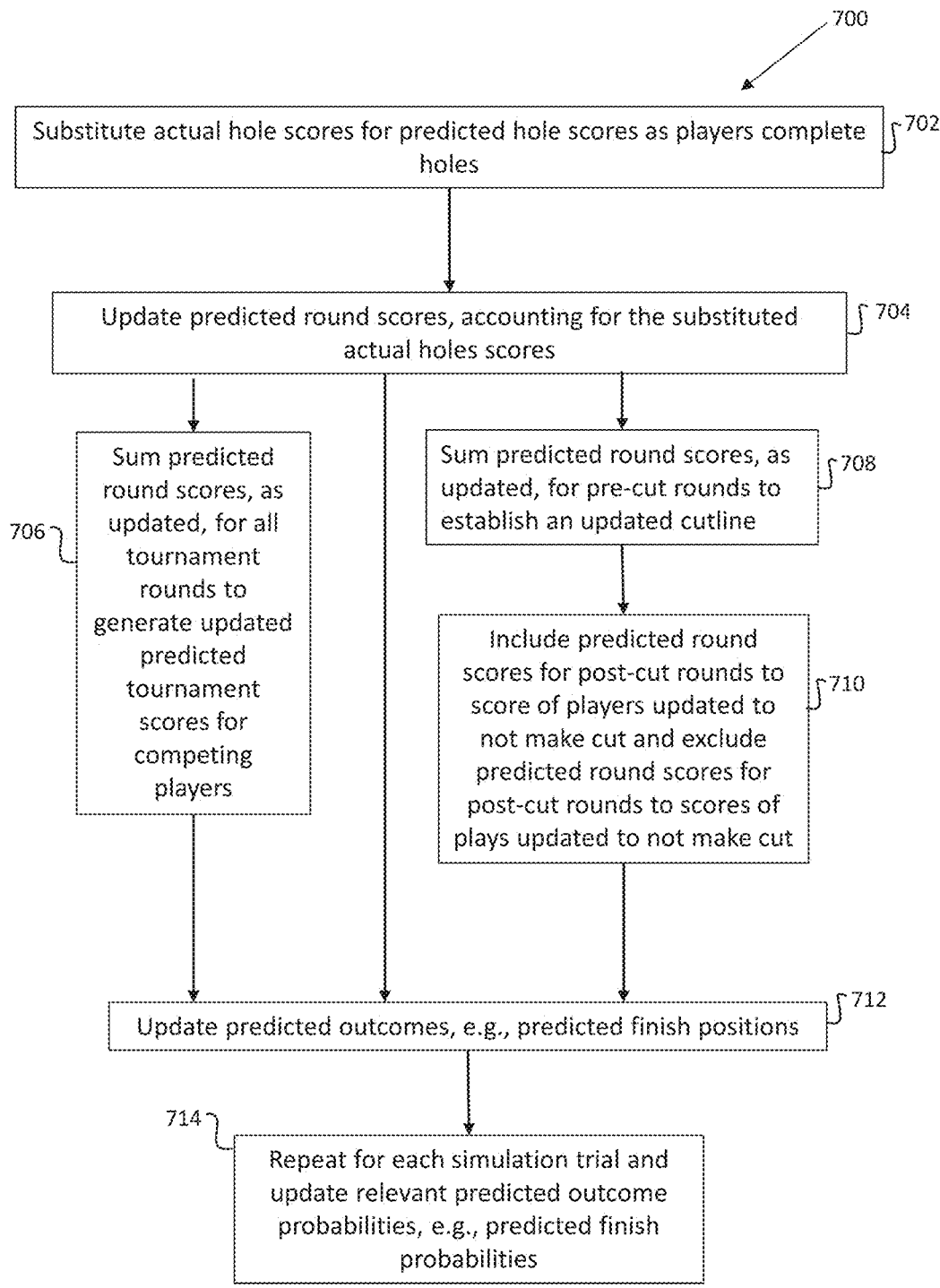
FIG. 7 schematically illustrates implementation logic of an update processor for updating predicted outcomes, predictive outcome probabilities, or both based on substitution of actual scoring for predicted scoring according to various embodiments described herein.

FIG. 7 illustrates an example update method 700 employing a substitution method. In one such example the update processor 70 of system 10 (FIG. 10) may be configured to substitute actual hole scores for predicted (adjusted or unadjusted) hole scores as players complete holes 702, e.g., continuously in real time, continuously in real time at pre-defining intervals or upon an occurrence of an event, or otherwise. The update processor 70 may update the predicted (adjusted or unadjusted) round scores, accounting for the substituted actual holes scores 704. The update processor 70, prediction engine 60, or both may be configured to sum the predicted (adjusted or unadjusted) round scores, as updated, for all tournament rounds to generate updated predicted tournament scores for competing players 706.

When the system 10 is configured to employ a cutline, the method 700 may include summing the predicted (adjusted or unadjusted) round scores, as updated, for pre-cut rounds to establish an updated cut-line 708 during the updating operations in pre-cut rounds. The system 10 or update processor 70 thereof may be configured to include predicted (adjusted or unadjusted) predicted round scores, which may or may not be subject to and update, for post-cut rounds to pre-cut rounds for players making an updated cut and exclude predicted (adjusted or unadjusted) predicted round scores for post-cut rounds for players not making the updated cut 710.

When the method 700 includes generating predictions related to finishing position or outcomes, the system 10 or update processor 70 thereof may further update the relevant predicted round/tournament finishing positions or predicted outcomes 712. When the method 700 includes generating predicted outcome or performance probabilities from the multiple simulations, the system 10 may be configured to repeat the above steps of method 700 for each simulation trial and update the relevant predicted outcome probabilities and performance finish probabilities 714. For example, the update processor 70, predictive outcome probability generator 64, or both may be configured to identify simulations in which a relevant outcome with respect to a predicted outcome probability is present and update the probability as necessary. Similarly, the update processor 70, predictive outcome probability generator 64, may identify finish positions relevant to finish position probabilities and update the probabilities as necessary.

It is to be appreciated that while the systems described herein may be configured or configurable to output pre-defined predictions, probabilities, or both that are automatically updated continuously in real time at intervals or upon the occurrence of one or more events, such as receipt of actual scores, in some embodiments, the system 10 may also be configured to be queried to output specific predictions, probabilities, or both derived from the simulations, which may include hybrid simulations updated to include actual score data.

Figure 8:
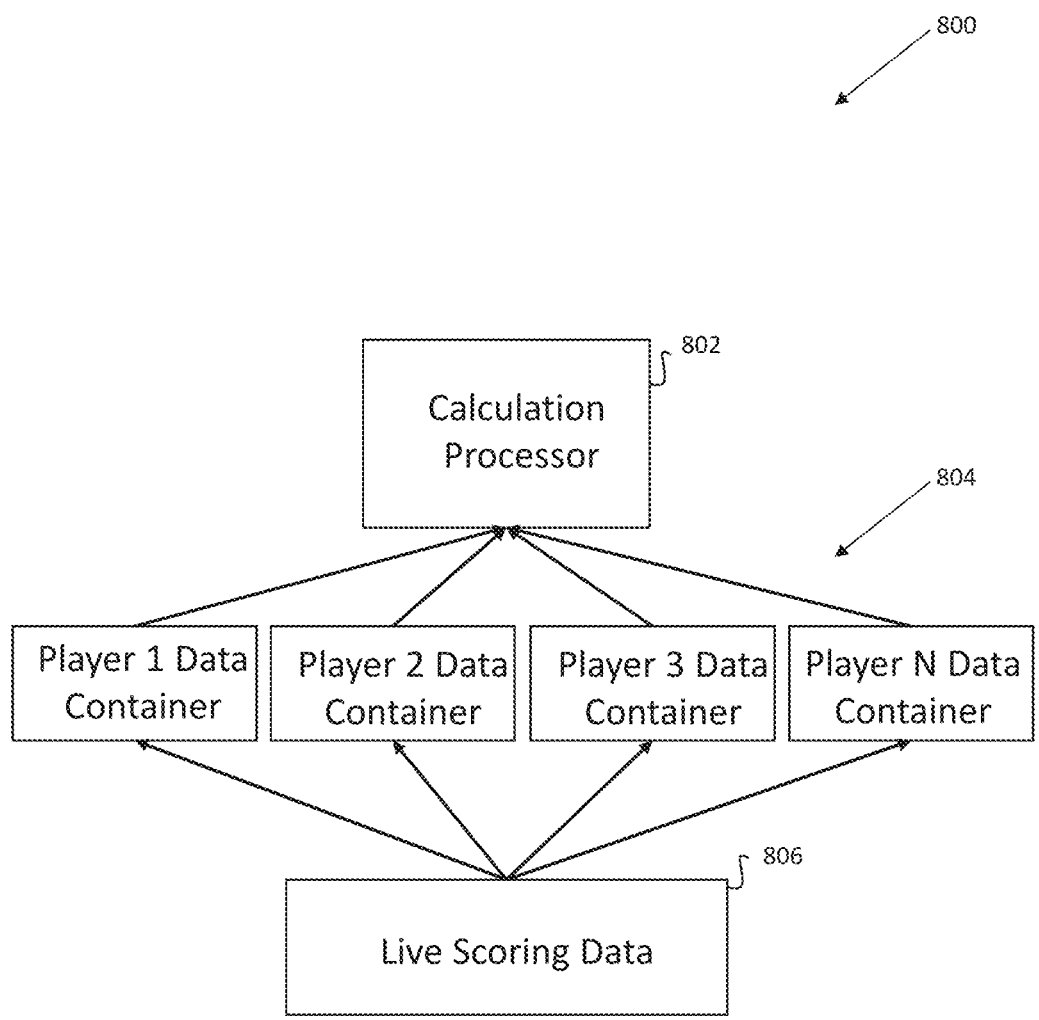
FIG. 8 illustrates an actual score substitution method for updating predicted outcomes, probabilities or both based with respect to the simulation model according to various embodiments described herein.

FIG. 8 is a schematic of an example substitution update processor 800. In various embodiments, the update processor 70 comprises update processor 800 or the functionalities thereof. In one approach, the update processor 800 generates a container 804 for each competing player in the field that contains only the data for that specific player for each of the simulated tournaments, which may be a single tournament simulation or multiple tournament simulations, e.g., hundreds or thousands. The score for each hole simulated may be retained in data files in the containers 804 which then is used for calculating that players scores for each round. A processor 802 may take score feeds, some of which incorporate actual scoring data 806, with respect to all player containers 804 and continuously recalculate all probabilities for each player, which in some embodiments may include updated cutline probabilities. As introduced above, this update processes may be executed continuously in real time, such as at intervals, upon the receipt of scoring data 806, or combination thereof. Intervals may be, for example, set at about every second, 2 seconds, 5 seconds, 10 seconds, 15 seconds, 20 seconds, 25 seconds, 30 seconds, 45 seconds, or minute. In one embodiment, the update process is executed at intervals of about every 5-60 seconds, 5-45 seconds, 5-30 seconds, 5-15 seconds, 5-10 seconds, less than every 5 seconds, 10 seconds, 15 seconds, 30 seconds, 45 seconds, or minute. In one configuration, the update process is completed about every 15 seconds. In a further configuration, the update process is repeated every 5-15 seconds during play until the tournament is completed. Additionally it could be the completion of an event such as a shot played or hole score that initiates the update process. The output from the update process 800 may create a data file that may be loaded in a database, e.g., a Dynamo database, for consumption by one or more end use applications. As players complete a hole during actual tournament play, all simulated scores for that hole in that specific round may be replaced with the actual scores from the actual scoring data 806. In some embodiments, the system 10 is configured to move the information for each player into the database using a player ID and a time-stamp to show the most recent probabilities and allow for trending displays for television broadcast and digitally across digital platforms, such as fan websites or betting platforms.

As an example illustration of the operations of the update processor 800 according to one embodiment, if player A makes a birdie on their first hole of round one of a tournament, for all simulation trials, the first hole of round one scores for player A are set to birdie. In some cases, some simulation results may already be a birdie and the simulation results would not be changed with respect to player A's first hole score for round one. However, for simulations in which player A's first hole score for round one is not a birdie, player A's first hole score for round one is updated to birdie in all such simulations to match the actual scoring data 806. Player A's score in the container 804 is then recalculated for their updated totals and fed to processor 802. The processor 802 is configured to recalculate all probabilities for each player and update the predicted probabilities. For instance, if the predicted probabilities include win probability, cutline, make cut probability, and top-10 finish position probability, the processor 802 is configured to recalculate these probabilities and update the predicted probabilities based on the actual scoring data 806.

Figure 9:
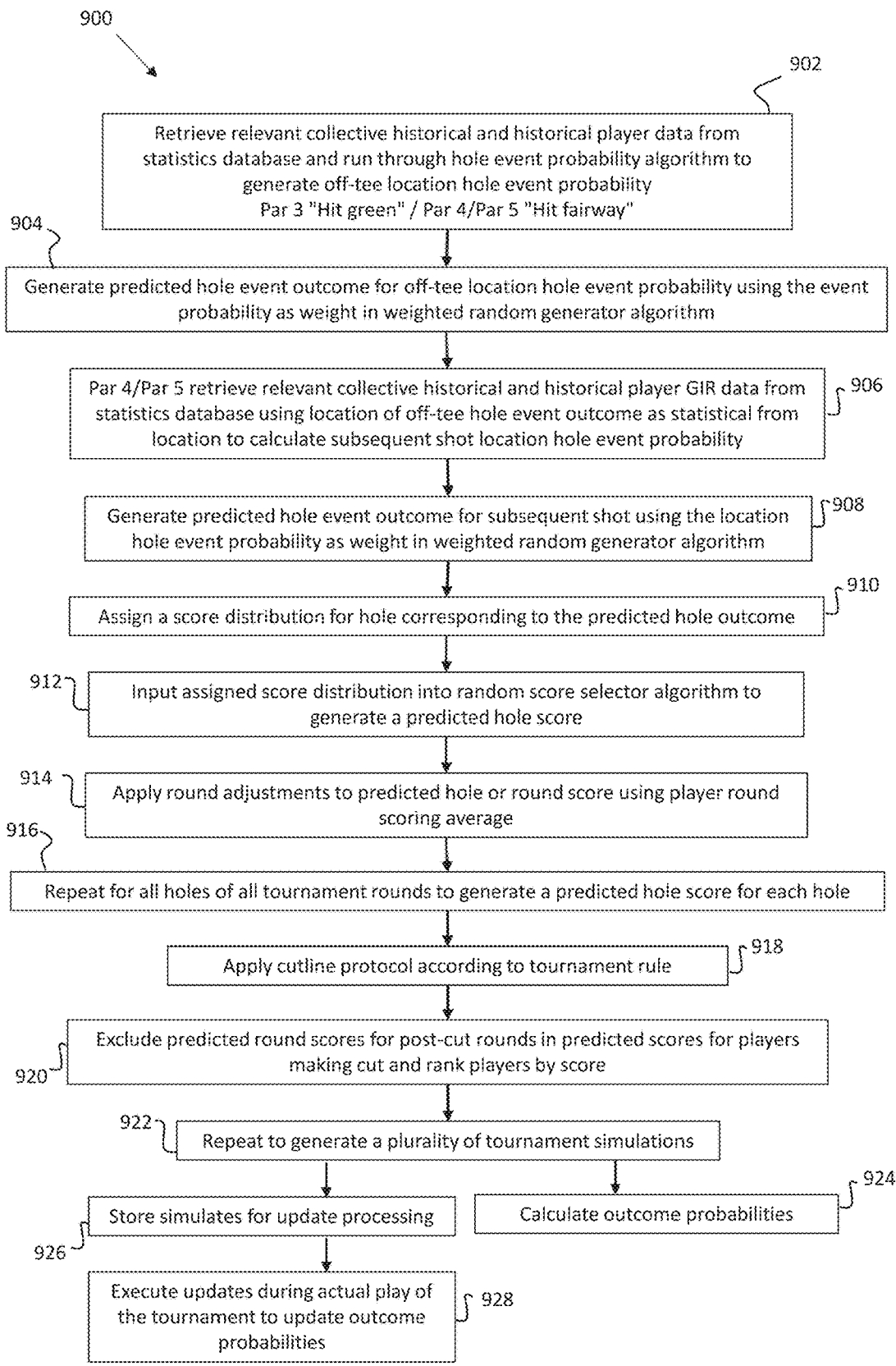
FIG. 9 illustrates a simulation modeling method according to various embodiments described herein.

FIG. 9 illustrates an example simulation method 900 for simulating a golf tournament that also generates predictive outcome probabilities that are updated by actual scores after competition begins.

At step 902, the method includes retrieving relevant collective historical and historical player data from a statistics database and running the statistics through a hole event probability algorithm to generate off-tee location hole event probability. In one example, a hole event probability generator is configured to pull the historical data. The off-tee hole event may correspond to a location the player hits the ball off-tee. The potential outcomes of the hole event may include two or more locations. The historical data used to generate the probability may include representative occurrence, e.g., percentage, of the occurrence the ball is hit to the location off-tec. While other combinations of data may be utilized, the illustrated example utilizes collective historical data and historical player data. For example, if the tournament is a PGA TOUR tournament, the statistics used may correspond to the TOUR average for hitting the location off-tee on the specific hole and the TOUR average and player average for hitting the location off-tee on holes having par ratings corresponding to the hole being simulated such that par 3 holes utilize statistics with respect to hitting the location off-tee on par 3 holes and par 4 and 5 holes utilize statistics with respect to hitting the location off-tee on par 4 and par 5 holes. In other examples, par 5 holes may utilize specific statistics for par 5 holes. In the illustrated embodiment, if the hole is a par 3, the off-tee hole event hit green is used, and if the hole is a par 4 or par 5, the off-tee hole event hit fairway is used.

The statistics employed in the model may include: Par 4 and Par 5 Hit Fairway Percentage—Player; Par 4 and Par 5 Hit Fairway Percentage—Hole; Par 4 and Par 5 Hit Green Percentage from Fairway—Player; Par 4 and Par 5 Hit Green Percentage from Non-Fairway—Player; Par 4 and Par 5 Hit Green Percentage from Fairway-Hole; Par 4 and Par 5 Hit Green Percentage from Non-Fairway—Hole; Par 3 Hit Green Percentage; Player scoring average by round; Scoring distributions for each hole; or combination thereof.

As described above, the collective historical data and historical player data may be taken over various available periods of time, rounds, or seasons. The statistics may be taken over a predetermined period of time, number of rounds, or seasons or partial seasons, which may include a current season or only prior seasons. In embodiments, collective historical data is taken based on multi-year average and historical player data may be based on a rolling average that may be less than collective historical data and, in one example, may be weighted for recency bias. In an example, collective historical data may be based on three to five year averages, which may depend on availability and relevance due to changes such as course alterations. Historical player data, such as statistics for players, may be based on a lesser period of time, such as one to three year rolling average. In a further example, the rolling average is weighted for more frequent play for relevance to the current tournament.

For a par 3 hole, the potential outcomes of the off-tee hole event in the illustrated example include hit green, which may be represented by a "1", and missed green, which may be represented by a "O". The historical data used to generate the probability may include representative occurrence, e.g., percentage of the location occurrence with respect to the player (GIR on par 3 holes) and collective averages for the hole (TOUR average for GIR on the hole) and on par 3 holes (TOUR average for GIR on par 3 holes).

For a par 4 or par 5 hole, the potential outcomes of the off-tee hole event in the illustrated example include hit fairway, which may be represented by "1", and missed fairway, which may be represented by "0". The historical data used to generate the probability may include representative occurrence, e.g., percentage of the location occurrence with respect to the player (percent of hit fairways on par 4/par 5 holes) and collective averages for the hole (TOUR average for hit fairway on the hole) and on par 4/par 5 holes (TOUR average for fairways hit on par 4/par 5 holes).

In the illustrated embodiment, weighted probabilities for the off-tee hole event generated that correspond to the par attribute of the hole 902. The statistics may be run through the hole event probability algorithm to generate a hit green percentage (par 3 hole) and hit fairway percentage (par 4/par 5 holes). In one example, the hole event probability algorithm includes the log 5(M) event probability model identified above where x=historical occurrence of the player performing the hole event, y=collective historical occurrence of the hole event on the particular hole, and z=collective historical occurrence of the hole event during play on multiple courses. As applied to a par 3 hole for a hit green hole event x=(player GIR % on par 3 holes), y=(hole GIR %), and z=(TOUR GIR % on par 3 holes). As applied to a par 4/par 5 holes for a hit fairway hole event, x=(player hit fairway %), y=(hole hit fairway %), and z=(TOUR hit fairway %).

Predicted hole event outcomes for the off-tee location hole event probability may be generated using the respective event probability as weight in weighted random generator algorithm 904. The off-tee examples provided above are binary. Thus, a binary weighted random generator algorithm may be used. In an example implementation with respect to a par 4 hole in which the probability value output from the event probability algorithm is 0.63, the binary random generator for hit fairway is weighted to a 63% chance to output a hit fairway outcome and a 37% chance to output a miss fairway outcome for the hole event prediction.

If the hole is a par 4/par 5, relevant collective historical and historical player GIR data may be retrieved from the statistics database using the location of off-tee hole event outcome as the statistical "from" location to calculate the subsequent shot location hole event probability 906. The subsequent shot hole event in this example is hit green and the predicted hole event outcome of the off-tee hole event is used to identify the from location that is used to define the historical statistics used to generate the event probability for hit green. For example, if step 904 output a hit fairway outcome for the off-tee hole event prediction, the collective historical and player historical data retrieved at step 906 corresponds to a hit from location of the fairway. Thus, the historical data used to generate the probability of hit green are GIR % from fairway rather than GIR % from non-fairway. The historical data used to generate the event probability is representative occurrence, e.g., percentage of the location occurrence with respect to the player (GIR on par 4/par 5 holes) and collective averages for the hole (TOUR average for GIR on the hole) and on par 4/par 5 holes (TOUR average for GIR on par 4/par 5 holes). If using the log 5(M) probability model, x="player GIR % from fairway", y="hole GIR % from fairway", and z="TOUR GIR % from fairway". The potential outcomes of the subsequent shot hole event in the illustrated example includes hit green, which may be represented by a "1", and missed green, which may be represented by a "0".

At step 908, a hole event outcome prediction is generated as in step 904. The predicted hole outcomes may be used to assign a score probability distribution for the hole that corresponds to the predicted hole outcome(s) 910. For example, if steps 904 and 908 returned predicted hole outcomes of hit fairway and hit green, the hole event outcome combination is (1, 1), and the score probability distribution assigned to the hole is the one corresponding to the (1, 1) combination. For example, a set of score probability distributions is generated or provided for each hole that includes a score probability distribution corresponding to each potential hole event outcome or combination, as the case may be. The hole event distributions may be generated as described herein. In one example, the sets of score probability distributions are based on the historic score distribution of the same historic actual hole event outcomes recorded on that hole. As an example, the combination of (1,1) for the par 4 hole may correspond to the following score probability distribution:

Triple Bogey=.01
Double Bogey=.02
Bogey=.10
Par=.66
Birdie=.20
Eagle=.01

A random score selector algorithm may be applied using the identified probability distribution 912. Returning to the par 4 hole example, the random score selector algorithm may select par. Thus, the player's score for this hole, in this round, for this trial is 4.

A round differential adjustment may be applied to predicted hole or round score using player round scoring average 914. As described above, the round scoring average may represent a relative performance difference of the player with respect to tournament rounds and is applied based on the day the simulated round is to occur with respect to the tournament (first round, second round, third round, fourth round). For example, the player may score –0.36 better than their average on the particular round being simulated. Thus, the score for the hole may be adjusted by applying a –0.02 point reduction for holes in this round of this simulation. As applied to the current hole, the adjusted predicted hole score is 3.98. As noted above, differential adjustments may be optional and in some embodiments the adjustment is applied to a round score rather than individual hole scores.

The above method may be repeated for all holes and rounds of the tournament 916.

A cutline protocol may be applied according to tournament rule 18. The cutline protocol may be applied as described above. In one example, the cutline protocol is similar to that described with respect to FIG. 3 and simulations are executed for all the rounds of tournament for each player as this data may be needed during actual play for update operations. In one example, for each set of four rounds in each tournament trial run, a cut is implemented according to tournament rule and is applied to the field for that trial. The system counts the simulated third and fourth rounds only for players actually or predicted to make the cut for that trial 920.

The above method may be repeated, e.g., hundreds or thousands of times, to generate a plurality of simulation trials 922.

Outcome probabilities may be calculated based on the occurrence of the outcomes in the simulation trials. Any desired outcome probability may be calculated, such as those described herein. In one example, the outcome probabilities include one or more of win probability, cutline value probability, top-10 finish probability, probability to make cut, or combination thereof.

A win probability may be established as described above. In one example, a win probability is established for each player in the field before the tournament is played based on the number of times that a player finishes first in an individual simulation of the event divided by the total number of simulations trials. In some embodiments, the lowest score of the players making the cut is identified as the winner of that simulation trial. The total number of wins for each player are then added together to create the pre-tournament win probability. In the case of a tie each player with the lowest score may be awarded a fraction of a win. As an example, a fraction of a win may be calculated by dividing 1 by the number of players who had the lowest score.

The results of the simulation trails are stored for use in the updating phases of method 926. Updates may be executed during actual play of the tournament to update outcome probabilities 928. The method may include continuing to calculate the probabilities with respect to each player after the tournament has started. As described above, the updates may be continuous at pre-defined intervals, upon receipt of updated scores, or combination thereof. The updates may incorporate real time scoring data that updates the outcome probabilities in real time. The updates may be executed as described above, for example, with respect to FIGS. 7 & 8 and accompanying text.

The systems and methods disclosed herein may include still further functionality and features. For example, the operative functions of the system 10 (FIG. 10) and method may be configured to execute on a special-purpose processor specifically configured to carry out the operations provided by the system 10 and method. Various embodiments of the present disclosure, including exemplary functional operations described in this disclosure, can be implemented in digital electronic circuitry, in tangibly-embodied computer software or firmware, in computer hardware, including the structures disclosed in this specification and their structural equivalents, or in combinations of one or more of them. That is, various embodiments of the present disclosure may be implemented as one or more computer programs, i.e., one or more modules of computer program instructions encoded on a tangible-non transitory computer readable medium for execution by, or to control the operation of, data processing apparatus. The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Notably, the operative features and functionality provided by the system 10 and method may increase the efficiency of computing devices that are being utilized to facilitate the functionality provided by the system 10 and the various methods discloses herein. For example, by utilizing the substitution methodology described herein, selection of hole event probabilities described herein, and/or other information provided and/or generated in the system 10, a reduced amount of computer operations may need to be performed by the devices in the system 10 using the processors and memories of the system 10 than compared to traditional methodologies. In such a context, less processing power needs to be utilized because the processors and memories do not need to be dedicated for processing. As a result, there are substantial savings in the usage of computer resources by utilizing the software, techniques, and algorithms provided in the present disclosure. In certain embodiments, various operative functionality of the system 10 may be configured to execute on one or more graphics processors and/or application specific integrated processors.

Notably, in certain embodiments, various functions and features of the system 10 and methods may operate without any human intervention and may be conducted entirely by computing devices. In certain embodiments, for example, numerous computing devices may interact with devices of the system 10 to provide the functionality supported by the system 10. Additionally, in certain embodiments, the computing devices of the system 10 may operate continuously and without human intervention to reduce the possibility of errors being introduced into the system 10. In certain embodiments, the system 10 and methods may also provide effective computing resource management by utilizing the features and functions described in the present disclosure. For example, in certain embodiments, devices in the system 10 may transmit signals indicating that only a specific quantity of computer processor resources (e.g. processor clock cycles, processor speed, etc.) may be devoted to utilizing the volume rendering, generating the surgical plan for the subject, conducting the registration process, and/or performing any other operation conducted by the system 10, or any combination thereof. For example, the signal may indicate a number of processor cycles of a processor may be utilized to enhance an image set via volume rendering, and/or specify a selected amount of processing power that may be dedicated to generating or any of the operations performed by the system 10.

In certain embodiments, any device in the system 10 may transmit a signal to a memory device to cause the memory device to only dedicate a selected amount of memory resources to the various operations of the system 10. In certain embodiments, the system 10 and methods may also include transmitting signals to processors and memories to only perform the operative functions of the system 10 and methods at time periods when usage of processing resources and/or memory resources in the system 10 is at a selected value. In certain embodiments, the system 10 and methods may include transmitting signals to the memory devices utilized in the system 10, which indicate which specific sections of the memory should be utilized to store any of the data utilized or generated by the system 10. Notably, the signals transmitted to the processors and memories may be utilized to optimize the usage of computing resources while executing the operations conducted by the system 10. As a result, such functionality provides substantial operational efficiencies and improvements over existing technologies.

Figure 11:
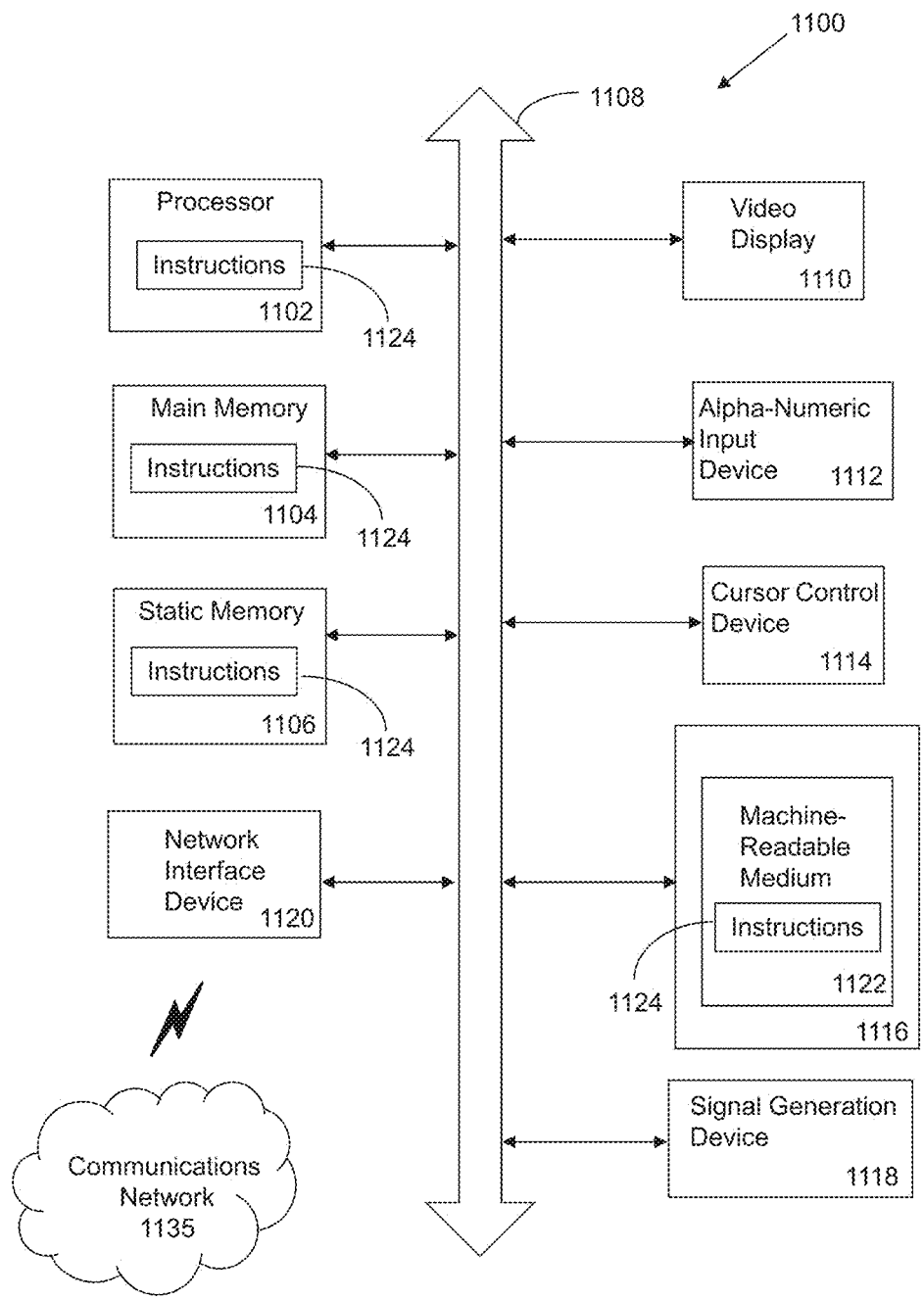
FIG. 11 is a schematic diagram of a machine in the form of a computer system within which a set of instructions, when executed, may cause the machine to perform simulation modeling to generation predictive outcomes and probabilities thereof according to various embodiments described herein.

Referring now also to FIG. 11, at least a portion of the methodologies and techniques described with respect to the exemplary embodiments of the system 10 can incorporate a machine, such as, but not limited to, computer system 1100, or other computing device within which a set of instructions, when executed, may cause the machine to perform any one or more of the methodologies or functions discussed above. The machine may be configured to facilitate various operations conducted by the system 10. For example, the machine may be configured to, but is not limited to, assist the system 10 by providing processing power to assist with processing loads experienced in the system 10, by providing storage capacity for storing instructions or data traversing the system 10, or by assisting with any other operations conducted by or within the system 10. As another example, the computer system 1100 may assist with generating models associated with generating predictions related to hole events, outcome generation, hole score generation, score probability distributions, predicted outcomes, predictive outcome probabilities, score differential adjustment, cutline value, players probabilities with respect to a cutline, updates to any thereof, or a combination thereof, present in an environment being monitored by the system 10. As another example, the computer system 1100 may assist with collection and/or importation and handling of historical data comprising tournament statistics of players, which may include those of a hole. As another example, the computer system 1100 may assist in generating score probability distributions, random score generations, weight outcome generation, or a combination thereof. As another example, the computer system 1100 may assist with output, distribution, or both of predictions to television broadcast, streaming broadcasts, digital platforms for viewing, manipulating, formatting, or combination thereof of the same.

In some embodiments, the machine may operate as a standalone device. In some embodiments, the machine may be connected to and assist with operations performed by other machines and systems, such as, but not limited to, any functionality, generator, adjuster, engine executor, or other functionality described herein, any of which may be provided by such other machines or systems to the machine for use by system 10 in performance of the operations described herein. The machine may be connected with any component in the system 10. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 1100 may include a processor 1102 (e.g., a central processing unit (CPU), a graphics processing unit (GPU, or both), a main memory 1104 and a static memory 1106, which communicate with each other via a bus 1108. The computer system 1100 may further include a video display unit 1110, which may be, but is not limited to, a liquid crystal display (LCD), a flat panel, a solid state display, or a cathode ray tube (CRT). The computer system 1100 may include an input device 1112, such as, but not limited to, a keyboard, a cursor control device 1114, such as, but not limited to, a mouse, a disk drive unit 1116, a signal generation device 1118, such as, but not limited to, a speaker or remote control, and a network interface device 1120.

The disk drive unit 1116 may include a machine-readable medium 1122 on which is stored one or more sets of instructions 1124, such as, but not limited to, software embodying any one or more of the methodologies or functions described herein, including those methods illustrated above. The instructions 1124 may also reside, completely or at least partially, within the main memory 1104, the static memory 1106, or within the processor 1102, or a combination thereof, during execution thereof by the computer system 1100. The main memory 1104 and the processor 1102 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 1122 containing instructions 1124 so that a device connected to the communications network 1135, another network, or a combination thereof, can send or receive voice, video or data, and communicate over the communications network 1135, another network, or a combination thereof, using the instructions. The instructions 1124 may further be transmitted or received over the communications network 1135, another network, or a combination thereof, via the network interface device 1120.

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

What is claimed is:

1. A system comprising:
a golf tournament simulation modeling system programmed to execute a plurality of & simulations of a golf tournament to generate predicted outcomes of the golf tournament, the golf tournament simulation modeling system comprising:
a memory storing instructions;
a processing unit that executes the instructions to perform programmed operations of the golf tournament simulation modeling system;
a hole event probability generator programmed to calculate a hole event probability for each of one or more hole events assigned to holes of a golf round of the golf tournament;
a hole event outcome generator programmed to generate a predicted hole event outcome with respect to each participating player for each of the one or more hole events for the holes using the calculated hole event probability for the respective hole event as weight, the weight based at least in part on historical statistics of golf play;
a hole score generator programmed to assign a score probability distribution for each hole of the round based on the one or more hole event outcomes generated for the hole and generate the predicted hole score for the player using the assigned score probability distribution; and
a prediction engine programmed to generate a prediction round score from the predicted hole scores and calculate probabilities of one or more of the predicted outcomes from the plurality of simulations.

2. The system of claim 1, wherein the historical statistics are representative of historical occurrence of the particular hole event in actual tournament play by collective players with respect to multiple holes, by collective players with respect to a specific hole being simulated, and by a player subject to the simulation with respect to multiple holes.

3. The system of claim 2, wherein the hole event probabilities are based on historical statistics related to holes having a par value corresponding to the hole being simulated.

4. The system of claim 1, wherein the hole event outcome of a first hole event for a first hole specifies an element required for identification of the historical statistics to be used to generate a hole event probability of a second hole event for the first hole.

5. The system of claim 1, wherein a first hole event probability for par 4 and par 5 holes comprises a probability the player hits the fairway off-tee, and a first hole event probability for a par 3 hole comprises a probability the player hits the green off-tee.

6. The system of claim 5, wherein the off-tee hole event probability uses the historical statistics comprising:
for par 3 holes: player GIR % on par 3 holes, collective GIR % for the hole, and collective GIR % on par 3 holes; and
for par 4 and par 5 holes: player hit fairway on par 4 and par 5 holes, collective hit fairway % for the hole, and collective hit fairway % on par 4 and par 5 holes.

7. The system of claim 5, wherein a second hole event probability for par 4 and par 5 holes comprises a probability the player hits the green from a location determined by the predicted outcome of the first hole event.

8. The system of claim 7, wherein, if the predicted hole event location outcome for the off-tee location hole event calculated for the hole is fairway, the historical statistics for a subsequent shot location hole event comprises historical statistics corresponding to historical occurrence of hitting the green from the fairway comprising player GIR % from fairway on par 4 and par 5 holes, collective GIR % from fairway on the hole, and collective GIR % from fairway on par 4 and par 5 holes, and if the predicted hole event location outcome for the off-tee location hole event calculated for the hole is non-fairway, the historical statistics for the subsequent shot location hole event comprises historical statistics corresponding to historical occurrence of hitting the green from non-fairway comprising player GIR % from non-fairway on par 4 and par 5 holes, collective GIR % from non-fairway on the hole, and collective GIR % from non-fairway on par 4 and par 5 holes.

9. The system of claim 1, wherein a hole event probability algorithm is used to generate the hole event probabilities, and wherein the hole event probability algorithm comprises:

$$P(\text{Event}) = \frac{\frac{xy}{z}}{\frac{xy}{z} + \frac{(1-x)(1-y)}{(1-z)}},$$

where x is a historical occurrence of the player performing the hole event, y is a collective historical occurrence of the hole event on the particular hole, and z is a collective historical occurrence of the hole event during play on multiple courses.

10. The system of claim 1, wherein the score probability distributions are representative of historical score distributions on the hole given occurrence of each potential hole event outcome or combination of hole event outcomes for the hole.

11. The system of a claim 1, further comprising an update processor programmed to update one or more predicted outcomes of the plurality of simulations, predicted outcome probabilities, or both based on inclusion of actual score data during actual play in the golf round, wherein the update processor is configured to:
substitute actual hole scores for predicted hole scores as players complete holes;
update predicted round scores, accounting for the substituted actual holes scores;
sum predicted round scores, as updated, for all tournament rounds to generate updated predicted tournament scores for competing players;
sum predicted round scores, as updated, for pre-cut rounds to establish an updated cutline;
include predicted round scores for post-cut rounds to score of players updated to not make cut; and
exclude predicted round scores for post-cut rounds to scores of plays updated to not make cut.

12. The system of claim 11, wherein the update processor is further programmed to transmit prediction outcome probabilities for each player into a database using a player ID and a time-stamp to show most recent probabilities to allow for trending displays for television broadcast and digitally across digital platforms.

13. A system for updating a golf tournament simulation, the system comprising:
an update processor programmed to execute update operations with respect to a golf tournament simulation following start of actual play in the golf;
a memory storing instructions;
a processing unit that executes the instructions to perform the programmed operations of the update processor, the operations comprising:
updating the tournament simulation of the golf tournament in real time by:
substituting actual hole scores for predicted hole scores as players complete holes;
updating predicted round scores, accounting for the substituted actual holes scores;
generating updated predicted tournament scores for all competing players from the updated predicted round scores for all tournament rounds;
establishing an updated cutline from the updated predicted round scores for pre-cut rounds; and
including in the updated predicted tournament scores predicted round scores for post-cut rounds to scores of players updated to make cut and excluding predicted round scores for post-cut rounds to scores of plays updated to not make cut.

14. The system of claim 13, further comprising:
updating predicted outcomes with respect to the tournament simulation of the golf tournament;
repeating the operations with respect to a plurality of additional tournament simulations of the golf tournament; and
updating one or more predicted outcome probabilities based on the collective updated predicted outcomes with respect to the tournament simulation of the golf tournament and the plurality of additional tournament simulations of the golf tournament.

15. The system of claim 14, wherein the one or more predicted outcome probabilities comprises a win probability, a top-10 finish probability, a cutline probability, and a probability of making a cut.

16. A method of simulating a golf event, the method comprising:
executing a round simulation for each participating player in a golf event with a golf tournament simulation modeling system programed to execute simulations of a golf tournament, the golf tournament simulation modeling system comprising memory storing instructions and a processing unit that executes the instructions to perform programmed operations of the golf tournament simulation modeling system, the operations comprising:
generating a predicted hole score for each hole of a golf round comprising, for each hole:
calculating, with a hole event probability generator, a hole event probability for each of one or more hole events assigned to a hole of a golf round;
generating, with a hole event outcome generator, a predicted hole event outcome for each hole event using the calculated event probability for the respective hole event as weight; and
generating, with a hole score generator, the predicted hole score hole using a score probability distribution corresponding to the one or more or more predicted hole outcomes generated for the hole;
generating, with a prediction engine, a predicted round score from the predicted hole scores; and
applying, with a modification engine, a score differential adjustment to a predicted hole score or predicted round score of a player based on a historical situational differential in scoring for the player with respect to a situation applicable to the round or tournament being simulated.

17. The method of claim 16, wherein the situation is selected from one or more of chronological, seasonal, geographical, environmental, tournament schedule, or round schedule.

18. The method of claim 16, wherein the historical situational differential in scoring comprises a differential in scoring average of the player during play in the situation relative to scoring average of the field in the situation or in tournament play over a period of time.

19. The method of claim 16, wherein the historical situational differential in scoring comprises a differential in scoring average of the player during play in the situation relative to a broader scoring average of the player in tournaments play over a period of time.

20. The method of claim 19, wherein the period of time comprises a current season.

21. The method of claim 16, wherein the historical situational differential in scoring comprises a scoring average differential of the player in tournament rounds corresponding to the tournament round being simulated relative to the player's broader scoring average in tournament rounds over period of time.

22. The method of claim 21, wherein the score differential adjustment is weighted such that more recent scores are given more weight than older scores.

23. The method of claim 16, wherein the differential score adjustment applied for a first player is based on the historical situational differential in scoring of the first player in a first situation applicable to the round or tournament, and the differential score adjustment applied for a second player is based on a historical situational differential in scoring of the second player in a second situation applicable to the round or tournament that is different than the first situation applicable to the round or tournament.

24. The method of 16, wherein calculating the one or more hole event probabilities is based, at least in part, on historical statistics representative of historical occurrence of the hole event in actual tournament play by collective players with respect to multiple holes, by collective players with respect to a specific hole being simulated, and by a player subject to the simulation with respect to multiple holes.

25. The method claim 24, wherein calculating the one or more hole event probabilities comprises processing, with a score distribution engine, historical statistics representative of historical occurrence of the hole event in actual tournament play through the following event probability model:

$$P(\text{Event}) = \frac{\frac{xy}{z}}{\frac{xy}{z} + \frac{(1-x)(1-y)}{(1-z)}}$$

where x is a historical occurrence of the player performing the hole event, y is a collective historical occurrence of the hole event on the particular hole, and z is a collective historical performance of the hole event during play on multiple courses.

26. The method of claim 25, wherein the hole event probability corresponds to a probability of the hole event occurring on the hole, and wherein the historical statistics are related to holes having a hole attribute corresponding to the hole being simulated.

27. The method of claim 26, wherein a first hole event probability for par 4 holes comprises a probability the player hits the fairway off-tee, wherein x is player hit fairway % on par 4 and par 5 holes, y is collective hit fairway % for the hole, and z is collective hit fairway % on par 4 and par 5 holes.

28. The method of claim 27, wherein a second hole event probability for the par 4 holes comprises a probability the player hits green on its subsequent shot from a location specified by the predicted outcome of the first hole event.

29. The method of claim 28, wherein, if the predicted outcome of the first hole event is hit fairway, the historical statistics correspond to historical occurrence of hitting the green from the fairway and x is player GIR % from fairway on par 4 and par 5 holes, y is hole collective GIR % from fairway on hole, and z is collective GIR % from fairway on par 4 and par 5 holes, and wherein if the predicted outcome of the first hole event is missed fairway, the historical statistics correspond to historical occurrence of hitting the green from the non-fairway and x is player GIR % from non-fairway on par 4 and par 5 holes, y is hole collective GIR % from non-fairway, and z is collective GIR % from non-fairway on par 4 and par 5 holes.

30. The method claim 16, wherein each hole is associated with a plurality of score probability distributions, each score probability distribution corresponding to a specific predicted hole event outcome or combination of predicted hole event outcomes of the hole.

* * * * *

UNITED STATES PATENT AND TRADEMARK OFFICE
CERTIFICATE OF CORRECTION

Page 1 of 2

PATENT NO. : 12,179,085 B2
APPLICATION NO. : 18/414237
DATED : December 31, 2024
INVENTOR(S) : Vitti et al.

It is certified that error appears in the above-identified patent and that said Letters Patent is hereby corrected as shown below:

In the Claims

Please amend Claim 1 as follows:
1. A system comprising:
a golf tournament simulation modeling system programmed to execute a plurality of simulations of a golf tournament to generate predicted outcomes of the golf tournament, the golf tournament simulation modeling system comprising:
a memory storing instructions;
a processing unit that executes the instructions to perform programmed operations of the golf tournament simulation modeling system;
a hole event probability generator programmed to calculate a hole event probability for each of one or more hole events assigned to holes of a golf round of the golf tournament;
a hole event outcome generator programmed to generate a predicted hole event outcome with respect to each participating player for each of the one or more hole events for the holes using the calculated hole event probability for the respective hole event as weight, the weight based at least in part on historical statistics of golf play;
a hole score generator programmed to assign a score probability distribution for each hole of the round based on the one or more hole event outcomes generated for the hole and generate the predicted hole score for the player using the assigned score probability distribution; and
a prediction engine programmed to generate a prediction round score from the predicted hole scores and calculate probabilities of one or more of the predicted outcomes from the plurality of simulations.

Please amend Claim 16 as follows:
16. A method of simulating a golf event, the method comprising:
executing a round simulation for each participating player in a golf event with a golf tournament simulation modeling system programed to execute simulations of a golf tournament, the golf tournament simulation modeling system comprising memory storing instructions and a processing unit that executes the instructions to perform programmed operations of the golf tournament simulation modeling system, the operations comprising:
generating a predicted hole score for each hole of a golf round comprising, for each hole:

Signed and Sealed this
Eighth Day of April, 2025

Coke Morgan Stewart
*Acting Director of the United States Patent and Trademark Office* calculating, with a hole event probability generator, a hole event probability for each of one or more hole events assigned to a hole of a golf round;
generating, with a hole event outcome generator, a predicted hole event outcome for each hole event using the calculated event probability for the respective hole event as weight; and
generating, with a hole score generator, the predicted hole score using a score probability distribution corresponding to the one or more or more predicted hole outcomes generated for the hole;
generating, with a prediction engine, a predicted round score from the predicted hole scores; and
applying, with a modification engine, a score differential adjustment to a predicted hole score or predicted round score of a player based on a historical situational differential in scoring for the player with respect to a situation applicable to the round or tournament being simulated.